United States Patent
Thielemans et al.

(10) Patent No.: US 12,443,384 B2
(45) Date of Patent: Oct. 14, 2025

(54) DISPLAY SYSTEM AND METHOD FOR MAPPING OF IMAGES

(71) Applicant: Stereyo BV, Nazareth (BE)

(72) Inventors: Robbie Thielemans, Nazareth (BE); Vince Dundee, Glendale, CA (US)

(73) Assignee: STEREYO BV, Nazareth (BE)

( * ) Notice: Subject to any disclaimer, the term of this patent is extended or adjusted under 35 U.S.C. 154(b) by 20 days.

(21) Appl. No.: 18/545,513

(22) Filed: Dec. 19, 2023

(65) Prior Publication Data

US 2024/0201927 A1  Jun. 20, 2024

Related U.S. Application Data

(63) Continuation-in-part of application No. 18/233,115, filed on Aug. 11, 2023, now Pat. No. 12,185,585, and a continuation-in-part of application No. 18/351,243, filed on Jul. 12, 2023, and a continuation-in-part of application No. 18/217,268, filed on Jun. 30, 2023, now Pat. No. 12,080,224, and a continuation-in-part of application No. 18/217,261, filed on Jun. 30, 2023, (Continued)

(51) Int. Cl.
*G06F 3/14* (2006.01)
*G06F 3/147* (2006.01)

(52) U.S. Cl.
CPC ............ *G06F 3/1446* (2013.01); *G06F 3/147* (2013.01)

(58) Field of Classification Search
CPC ............................. G06F 3/147; G06F 3/1446
See application file for complete search history.

(56) References Cited

U.S. PATENT DOCUMENTS 5,767,818 A   6/1998   Nishida
6,055,071 A   4/2000   Kuwata et al.
(Continued)

FOREIGN PATENT DOCUMENTS

BE   20195196   3/2019
BE   20195142   7/2019
(Continued)

OTHER PUBLICATIONS

Baker, Simon, "Pulse Width Modulation (PWM)", Mar. 17, 2015, 13 pages, TFT Central.
(Continued)

*Primary Examiner* — Muhammad N Edun
(74) *Attorney, Agent, or Firm* — Workman Nydegger

(57) ABSTRACT

Display systems and methods are disclosed. A display system includes one or more display units, each respectively comprising a display tile and a processor. Each of the display tiles includes one or more LEE display modules, each of the LEE display modules respectively including an array of a plurality of light-emitting elements (LEEs). Each of the processors are configured, for the respective display tile, to: receive position information of at least one of said one or more LEE display modules, receive data to be displayed by said at least one of said one or more LEE display modules, said data having an original location to be displayed to, and perform a mapping of said data to be displayed to a target location of said at least one LEE display module taking into account said position information of at least one of said one or more LEE display modules.

22 Claims, 7 Drawing Sheets

Related U.S. Application Data now Pat. No. 12,199,079, and a continuation-in-part of application No. 18/217,201, filed on Jun. 30, 2023, now Pat. No. 12,119,330, and a continuation-in-part of application No. 18/216,459, filed on Jun. 29, 2023, now Pat. No. 12,100,363, and a continuation-in-part of application No. 18/322,279, filed on May 23, 2023.

(60) Provisional application No. 63/433,646, filed on Dec. 19, 2022.

(56) References Cited

U.S. PATENT DOCUMENTS

| | | |
|---|---|---|
| 6,483,555 B1 | 11/2002 | Thielemans et al. |
| 6,717,625 B1 | 4/2004 | Thielemans |
| 7,015,902 B2 | 3/2006 | Nagai et al. |
| 7,019,721 B2 | 3/2006 | Thielemans et al. |
| 7,071,620 B2 | 7/2006 | Devos et al. |
| 7,071,894 B1 | 7/2006 | Thielemans et al. |
| 7,079,092 B2 | 7/2006 | Tanghe et al. |
| 7,102,601 B2 | 9/2006 | Devos et al. |
| 7,157,838 B2 | 1/2007 | Thielemans et al. |
| 7,176,861 B2 | 2/2007 | Dedene et al. |
| 7,205,729 B2 | 4/2007 | Thielemans et al. |
| 7,227,519 B1 | 6/2007 | Kawase et al. |
| 7,262,753 B2 | 8/2007 | Tanghe et al. |
| 7,301,273 B2 | 11/2007 | Dedene et al. |
| 7,365,720 B2 | 4/2008 | Bouwens et al. |
| 7,443,466 B2 | 10/2008 | Dedene et al. |
| 7,777,691 B1 | 8/2010 | Nimmer et al. |
| D730,309 S | 5/2015 | Hochman et al. |
| 9,069,519 B1 | 6/2015 | Hall |
| D751,998 S | 3/2016 | Hochman et al. |
| 9,380,720 B2 | 6/2016 | Thielemans et al. |
| 9,477,438 B1 | 10/2016 | Hochman et al. |
| D771,844 S | 11/2016 | Hochman et al. |
| 9,524,666 B2 | 12/2016 | Hochman et al. |
| 9,660,403 B2 | 5/2017 | Hochman et al. |
| 10,325,541 B2 | 6/2019 | Hochman et al. |
| 10,333,109 B2 | 6/2019 | Hochman et al. |
| 10,892,297 B2 | 1/2021 | Chae et al. |
| 10,917,679 B2 | 2/2021 | Dunning et al. |
| 11,310,436 B2 | 4/2022 | Hochman et al. |
| 11,328,655 B2 | 5/2022 | Sugiyama et al. |
| 11,445,123 B2 | 9/2022 | Deighton |
| 11,496,726 B2 | 11/2022 | Deighton |
| 11,552,061 B2 | 1/2023 | Chae et al. |
| 11,610,543 B2 | 3/2023 | Thielemans et al. |
| 11,695,907 B2 | 7/2023 | Steudel et al. |
| 11,881,151 B2 | 1/2024 | Thielemans et al. |
| 11,924,560 B2 | 3/2024 | Thielemans et al. |
| 11,948,501 B2 | 4/2024 | Thielemans et al. |
| 11,948,506 B2 | 4/2024 | Thielemans et al. |
| 2002/0163513 A1 | 11/2002 | Tsuji |
| 2003/0095138 A1 | 5/2003 | Kim et al. |
| 2003/0128299 A1 | 7/2003 | Coleman et al. |
| 2003/0133619 A1 | 7/2003 | Wong et al. |
| 2004/0113875 A1 | 6/2004 | Miller et al. |
| 2004/0207315 A1 | 10/2004 | Thielemans et al. |
| 2004/0212582 A1 | 10/2004 | Thielemans et al. |
| 2004/0233125 A1 | 11/2004 | Tanghe et al. |
| 2004/0233148 A1 | 11/2004 | Tanghe et al. |
| 2005/0017922 A1 | 1/2005 | Devos et al. |
| 2005/0052375 A1 | 3/2005 | Devos et al. |
| 2005/0116667 A1 | 6/2005 | Mueller et al. |
| 2005/0122406 A1 | 6/2005 | Voss et al. |
| 2005/0128751 A1 | 6/2005 | Roberge et al. |
| 2005/0133761 A1 | 6/2005 | Thielemans |
| 2005/0134525 A1 | 6/2005 | Tanghe et al. |
| 2005/0134526 A1 | 6/2005 | Willem et al. |
| 2005/0213128 A1 | 9/2005 | Imai et al. |
| 2006/0022914 A1 | 2/2006 | Kimura et al. |
| 2006/0139238 A1 | 6/2006 | Chiba et al. |
| 2006/0290614 A1 | 12/2006 | Nathan et al. |
| 2007/0081357 A1 | 4/2007 | Kim et al. |
| 2007/0241988 A1 | 10/2007 | Zerphy et al. |
| 2007/0253008 A1 | 11/2007 | Edge et al. |
| 2007/0263394 A1 | 11/2007 | Thielemans et al. |
| 2008/0046217 A1 | 2/2008 | Polonskiy et al. |
| 2008/0079816 A1 | 4/2008 | Yen et al. |
| 2008/0111773 A1 | 5/2008 | Tsuge |
| 2008/0165081 A1 | 7/2008 | Lawther et al. |
| 2008/0285981 A1 | 11/2008 | Diab et al. |
| 2009/0009103 A1 | 1/2009 | McKechnie et al. |
| 2009/0066631 A1 | 3/2009 | Lianza |
| 2009/0102957 A1 | 4/2009 | Phelan |
| 2009/0103200 A1 | 4/2009 | Feklistov et al. |
| 2009/0295706 A1 | 12/2009 | Feng |
| 2010/0001648 A1 | 1/2010 | De Clercq et al. |
| 2010/0103200 A1 | 4/2010 | Langendijk |
| 2010/0243025 A1 | 9/2010 | Bhatia et al. |
| 2010/0289783 A1 | 11/2010 | Leppla |
| 2010/0302284 A1 | 12/2010 | Karaki |
| 2010/0309218 A1 | 12/2010 | Suen et al. |
| 2011/0103013 A1 | 5/2011 | Furukawa |
| 2011/0121761 A1 | 5/2011 | Zhao |
| 2011/0176029 A1 | 7/2011 | Boydston et al. |
| 2012/0019633 A1 | 1/2012 | Holley |
| 2012/0033876 A1 | 2/2012 | Momeyer et al. |
| 2012/0062622 A1 | 3/2012 | Koyama et al. |
| 2012/0133837 A1 | 5/2012 | Furukawa |
| 2012/0287289 A1 | 11/2012 | Steinberg et al. |
| 2012/0307243 A1 | 12/2012 | Elliott |
| 2012/0313979 A1 | 12/2012 | Matsuura |
| 2013/0162696 A1 | 6/2013 | Matsumoto |
| 2013/0181884 A1 | 7/2013 | Perkins et al. |
| 2013/0226495 A1 | 8/2013 | Marcu et al. |
| 2013/0249377 A1 | 9/2013 | Hamer et al. |
| 2013/0272213 A1 | 10/2013 | Lai |
| 2014/0002718 A1 | 1/2014 | Spielberg |
| 2014/0009485 A1 | 1/2014 | Asanuma |
| 2014/0009505 A1 | 1/2014 | Moon et al. |
| 2014/0049571 A1 | 2/2014 | Erinjippurath et al. |
| 2014/0049983 A1 | 2/2014 | Nichol et al. |
| 2014/0125818 A1 | 5/2014 | Friend |
| 2015/0070402 A1 | 3/2015 | Shah et al. |
| 2015/0170399 A1* | 6/2015 | Li ........................ H04N 13/327 345/426 |
| 2015/0186097 A1 | 7/2015 | Hall |
| 2015/0229919 A1 | 8/2015 | Weber et al. |
| 2015/0339977 A1 | 11/2015 | Nathan et al. |
| 2015/0348479 A1 | 12/2015 | Kim et al. |
| 2015/0371405 A1 | 12/2015 | Zhao |
| 2016/0078802 A1 | 3/2016 | Liang et al. |
| 2016/0124091 A1 | 5/2016 | Kawahito et al. |
| 2016/0182790 A1 | 6/2016 | Horesh |
| 2016/0275835 A1 | 9/2016 | Yuan et al. |
| 2016/0291747 A1* | 10/2016 | Fischer ................ G06F 3/1446 |
| 2016/0335958 A1 | 11/2016 | Huang et al. |
| 2017/0032715 A1 | 2/2017 | Sutherland et al. |
| 2017/0032742 A1 | 2/2017 | Piper et al. |
| 2017/0061924 A1 | 3/2017 | Lee et al. |
| 2017/0069871 A1 | 3/2017 | Yim et al. |
| 2017/0171492 A1 | 6/2017 | Naito |
| 2017/0284630 A1 | 10/2017 | Sergenese et al. |
| 2017/0318178 A1 | 11/2017 | Debevec et al. |
| 2018/0018793 A1 | 1/2018 | Min et al. |
| 2018/0060014 A1 | 3/2018 | Son et al. |
| 2018/0090102 A1 | 3/2018 | Chappalli et al. |
| 2018/0091860 A1 | 3/2018 | Stokking et al. |
| 2018/0131160 A1 | 5/2018 | Zhang et al. |
| 2018/0235052 A1 | 8/2018 | Tada |
| 2018/0240409 A1 | 8/2018 | Li et al. |
| 2018/0342224 A1 | 11/2018 | Beon et al. |
| 2019/0064923 A1 | 2/2019 | Taniguchi |
| 2019/0080656 A1 | 3/2019 | Herranz et al. |
| 2019/0098293 A1 | 3/2019 | Lee et al. |
| 2019/0132560 A1 | 5/2019 | Grosse et al. |
| 2019/0172404 A1 | 6/2019 | Zhu |
| 2019/0209858 A1 | 7/2019 | Slaughter et al. |
| 2019/0212719 A1 | 7/2019 | Ono |
| 2019/0213951 A1 | 7/2019 | Li et al. |
| 2019/0244561 A1 | 8/2019 | Zong et al. |
| 2019/0295457 A1 | 9/2019 | Li et al. |

(56) References Cited

U.S. PATENT DOCUMENTS

| | | |
|---|---|---|
| 2019/0306477 A1 | 10/2019 | Nordback |
| 2019/0356940 A1 | 11/2019 | Mallett |
| 2019/0364309 A1 | 11/2019 | Von Braun et al. |
| 2019/0377535 A1 | 12/2019 | Rycyna et al. |
| 2020/0014904 A1 | 1/2020 | Wetzstein et al. |
| 2020/0027386 A1 | 1/2020 | Wang et al. |
| 2020/0037011 A1 | 1/2020 | Zong et al. |
| 2020/0043201 A1 | 2/2020 | Tanaka et al. |
| 2020/0098333 A1 | 3/2020 | Marcu |
| 2020/0126501 A1 | 4/2020 | Yamazaki et al. |
| 2020/0160791 A1 | 5/2020 | Chung |
| 2020/0225903 A1* | 7/2020 | Cohen ............... G09G 5/12 |
| 2020/0280761 A1 | 9/2020 | Staples |
| 2020/0286424 A1 | 9/2020 | Thielemans et al. |
| 2020/0388210 A1 | 12/2020 | Thielemans et al. |
| 2020/0403117 A1 | 12/2020 | Fabien et al. |
| 2021/0005161 A1 | 1/2021 | Lee |
| 2021/0014385 A1 | 1/2021 | Boggavarapu et al. |
| 2021/0056937 A1 | 2/2021 | Sakai |
| 2021/0124174 A1 | 4/2021 | Tokunaga et al. |
| 2021/0125545 A1 | 4/2021 | Sohn et al. |
| 2021/0125570 A1 | 4/2021 | Kang et al. |
| 2021/0185778 A1 | 6/2021 | Otten |
| 2021/0201769 A1 | 7/2021 | Morris et al. |
| 2021/0217157 A1 | 7/2021 | Han et al. |
| 2021/0225267 A1 | 7/2021 | Thielemans et al. |
| 2021/0227270 A1 | 7/2021 | Braun |
| 2021/0266624 A1 | 8/2021 | Zong et al. |
| 2021/0295766 A1 | 9/2021 | Sugiyama et al. |
| 2021/0297717 A1 | 9/2021 | Braun |
| 2021/0306394 A1 | 9/2021 | Zong et al. |
| 2021/0321032 A1 | 10/2021 | Braun |
| 2021/0345058 A1 | 11/2021 | Itakura et al. |
| 2021/0366411 A1 | 11/2021 | Yang et al. |
| 2021/0383842 A1 | 12/2021 | Han et al. |
| 2021/0397398 A1 | 12/2021 | Han et al. |
| 2022/0014728 A1 | 1/2022 | Deighton |
| 2022/0020727 A1 | 1/2022 | Noh et al. |
| 2022/0059045 A1 | 2/2022 | Kobayashi et al. |
| 2022/0059607 A1 | 2/2022 | Murugan et al. |
| 2022/0060612 A1 | 2/2022 | Hochman et al. |
| 2022/0076615 A1 | 3/2022 | Ding et al. |
| 2022/0103738 A1 | 3/2022 | Deighton |
| 2022/0150456 A1 | 5/2022 | Steudel et al. |
| 2022/0191109 A1 | 6/2022 | Chen et al. |
| 2022/0246670 A1 | 8/2022 | Chen et al. |
| 2022/0254317 A1 | 8/2022 | Hochman et al. |
| 2022/0350562 A1 | 11/2022 | Wang et al. |
| 2022/0375387 A1 | 11/2022 | Deighton |
| 2022/0375403 A1 | 11/2022 | Cheng et al. |
| 2022/0413790 A1 | 12/2022 | Cai et al. |
| 2023/0013582 A1 | 1/2023 | Wang et al. |
| 2023/0154399 A1 | 5/2023 | Thielemans et al. |
| 2023/0162400 A1 | 5/2023 | Liu et al. |
| 2023/0162662 A1 | 5/2023 | Zhang et al. |
| 2023/0163142 A1 | 5/2023 | Lu et al. |
| 2023/0186821 A1 | 6/2023 | Hashempour et al. |
| 2023/0209207 A1 | 6/2023 | Hochman et al. |
| 2023/0274693 A1 | 8/2023 | Thielemans et al. |
| 2023/0282153 A1 | 9/2023 | Thielemans et al. |
| 2023/0298503 A1 | 9/2023 | Zhang et al. |
| 2023/0326175 A1 | 10/2023 | Zhang et al. |
| 2024/0022686 A1 | 1/2024 | Thielemans et al. |
| 2024/0044465 A1 | 2/2024 | Thielemans et al. |
| 2024/0247947 A1* | 7/2024 | Zeng ............... G01C 21/3896 |

FOREIGN PATENT DOCUMENTS

| | | |
|---|---|---|
| BE | 1026226 A1 | 11/2019 |
| CN | 102290003 A | 12/2011 |
| CN | 206741357 U | 12/2017 |
| CN | 207352560 U | 5/2018 |
| CN | 110602875 A | 12/2019 |
| CN | 110617000 A | 12/2019 |
| DE | 102006054856 A1 | 1/2009 |
| EP | 1172783 A1 | 1/2002 |
| EP | 1780798 A1 | 5/2007 |
| EP | 2323072 A1 | 5/2011 |
| EP | 3099058 A1 | 11/2016 |
| EP | 3139422 A2 | 3/2017 |
| GB | 2469819 A | 11/2010 |
| JP | 2007062892 A | 3/2007 |
| JP | 2019214445 A | 12/2019 |
| KR | 20170065163 A | 6/2017 |
| TW | 200608327 A | 3/2006 |
| TW | 200608328 A | 3/2006 |
| WO | 2013186278 A1 | 12/2013 |
| WO | 2015114720 A1 | 8/2015 |
| WO | 2018164105 A1 | 9/2018 |
| WO | 2019215219 A1 | 11/2019 |
| WO | 2020253249 A1 | 12/2020 |
| WO | 2021009719 A1 | 1/2021 |
| WO | 2022013191 A1 | 1/2022 |
| WO | 2022064062 A1 | 3/2022 |
| WO | 2022087322 A1 | 4/2022 |

OTHER PUBLICATIONS

Burr, David, "Motion Perception: Human Psychophysics", Apr. 18, 2013, pp. 763-776, MIT Press.

Cast, Inc., "Understanding—and Reducing—Latency in Video Compression Systems", Oct. 25, 2013, 7 pages, retrieved from <https://web.archive.org/web/20131025202911/https://www.design-reuse.com/articles/33005/understanding-latency-in-video-compression-systems.html>.

Davis et al., "Humans perceive flicker artifacts at 500 Hz", Feb. 3, 2015, 4 pages, Nature, Scientific Reports.

Kang et al., "Nanoimprinted Semitransparent Metal Electrodes and Their Application in Organic Light-Emitting Diodes," May 21, 2007, 6 pages, Advanced Materials.

Larson, Jennifer, "How Many Frames Per Second Can the Human Eye See?", Oct. 20, 2020, 12 pages, retrieved from <https://www.healthline.com/health/human-eye-fps>.

Lee et al., "Solution-Processed Metal Nanowire Mesh Transparent Electrodes", Jan. 12, 2008, pp. 689-692, Nano Letters, vol. 8, No. 2.

Mackin et al., "High Frame Rates and the Visibility of Motion Artifacts", Jun. 30, 2017, 19 pages, SMPTE Motion Imaging Journal, vol. 126, Issue 5.

Thielemans, Robbie, "Displays Applications of LEDs", Handbook of Visual Display Technology, May 21, 2011, 14 pages.

Thielemans, Robbie, "LED Display Applications and Design Considerations", Handbook of Visual Display Technology, May 21, 2011, 5 pages, retrieved from https://link.springer.com/referenceworkentry/10.1007/978-3-540-79567-4_76.

Tobii Connect, "The speed of human visual perception", Sep. 14, 2022, 1 page, retrieved from <https://connect.tobii.com/s/article/the-speed-of-human-perception?language=en_US>.

Wilson, Derek, "Exploring Input Lag Inside Out", Jul. 16, 2019, 2 pages, retrieved from <https://www.anandtech.com/show/2803>.

Zhang, Yin, "Performance Characteristics of Lithium Coin Cells for Use in Wireless Sensing Systems", Jun. 17, 2012, 143 pages, All Theses and Dissertations, Brigham Young University.

"The Ins and Outs of HDR—Gamma Curves", Jun. 8, 2020, 3 pages, retrieved from <https://www.eizoglobal.com/library/management/ins-and-outs-of-hdr/index2.html>.

Extended European Search Report from corresponding EP Application No. EP18198749.6, Nov. 12, 2018.

International Search Report and Written Opinion from PCT Application No. PCT/EP2019/061804, Jun. 13, 2019.

Applicant's Amendment/Remarks filed at the EPO on Feb. 20, 2020 for PCT/EP2019/061804.

Applicant's Amendment/Remarks filed at the EPO on May 26, 2020 for PCT/EP2019/061804.

International Preliminary Report on Patentability from PCT/EP2019/061804, Jul. 10, 2020.

Belgian Search Report from BE Application No. 201905196, Aug. 13, 2019.

Search Report for BE 2019/05759 mailed Jan. 23, 2020, 18 pages.

(56) References Cited

OTHER PUBLICATIONS

Belgian Search Report for Belgian Patent Application No. BE2019/5970, Jul. 24, 2020.
Response to Belgian Search Report for Belgian Patent Application No. BE2019/5970, at the Belgian Patent Office on Nov. 24, 2020.
Belgian Search Report from corresponding Belgian Application No. BE 202205007, Jun. 7, 2022.
Extended European Search Report from corresponding EP Application No. 22185014.2, Dec. 8, 2022.
Office Action from European Application No. 19722133.6, Jan. 19, 2023.
Extended European Search Report from Corresponding European Patent Application No. EP23218356.6, Apr. 5, 2024.
Belgian Search Report from Belgian Patent Application No. BE202305595, Nov. 21, 2023.
Response to Belgian Search Report from Belgian Patent Application No. BE2023/5595, filed Mar. 21, 2024.
Extended European Search Report from European Patent Application No. EP23185674.1, Nov. 16, 2023.
Partial European Search Report from European Patent Application No. EP23198096, Nov. 29, 2023.
Extended European Search Report from European Patent Application No. EP23198096.2, Apr. 9, 2024.
Extended European Search Report from European Patent Application No. EP23190432.7, Feb. 12, 2024.
Extended European Search Report from European Patent Application No. EP23160521, Jul. 6, 2023.
Response to Extended European Search Report from European Patent Application No. EP23160521, dated Jan. 29, 2024.
Extended European Search Report from European Patent Application No. EP23218322.8, Mar. 27, 2024.
Extended European Search Report from European Patent Application No. EP23218336.8, Apr. 10, 2024.
Partial European Search Report from European Patent Application No. EP23218348.3, Apr. 30, 2024.
Extended European Search Report from European Patent Application No. EP23218353.3, Mar. 26, 2024.
Extended European Search Report from European Patent Application No. EP23218356.6, Apr. 5, 2024.
Extended European Search Report from European Patent Application No. EP23218377.2, Apr. 24, 2024.
Wikipedia, "MAC Address", 10 pages, retrieved from <https://en.wikipedia.org/wiki/MAC_address>, retrieved May 30, 2023.

* cited by examiner

FIG. 4
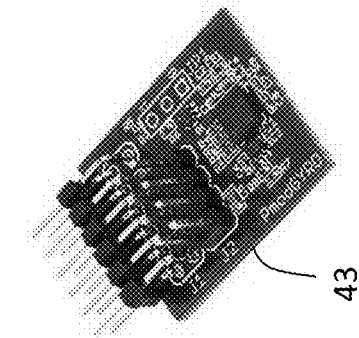
FIG. 4a
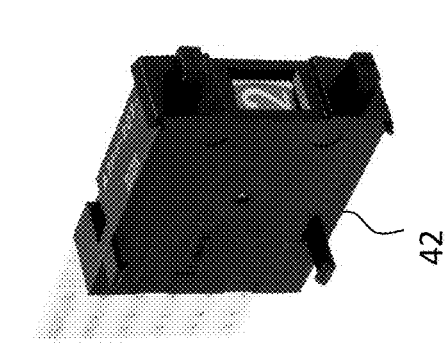
FIG. 4b
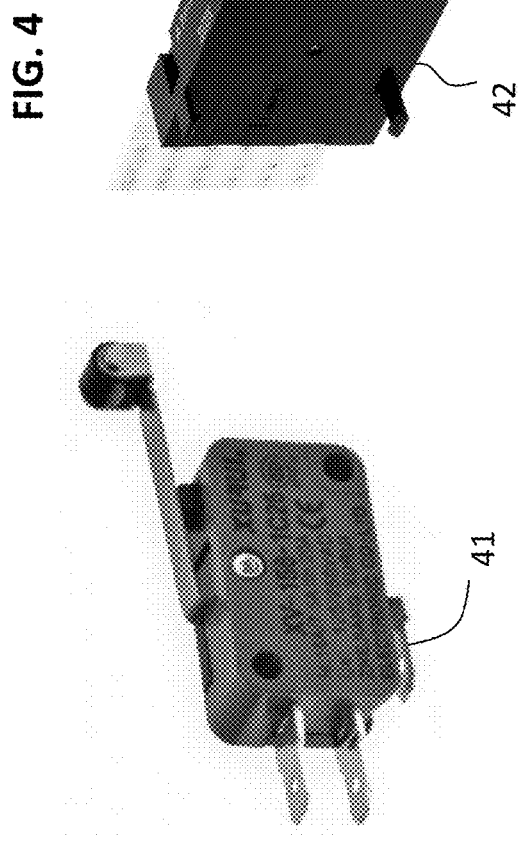
FIG. 4c
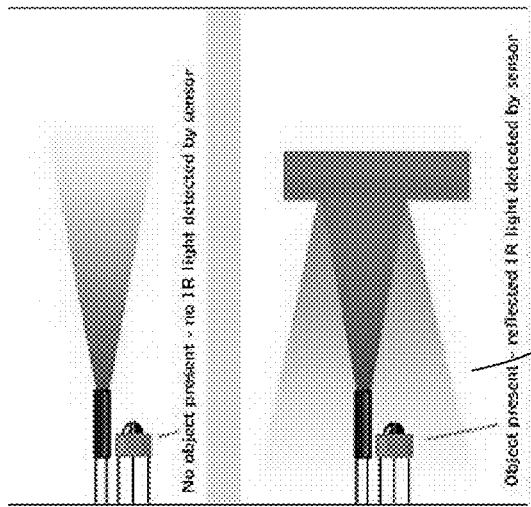
FIG. 4d
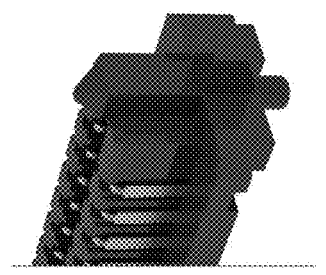
FIG. 4e
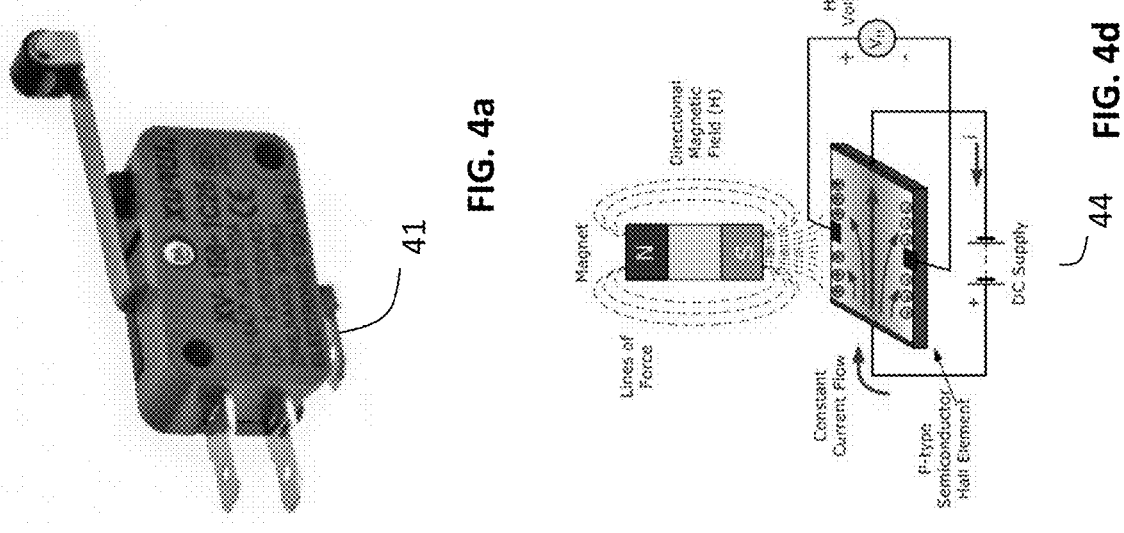
FIG. 4f

DISPLAY SYSTEM AND METHOD FOR MAPPING OF IMAGES

CROSS-REFERENCE TO RELATED APPLICATIONS

This application claims the benefit of and priority to U.S. Provisional Patent Application Ser. No. 63/433,646 filed on Dec. 19, 2022 and entitled "Modular Display with Integrated on Camera Feature Sets," which is expressly incorporated herein by reference. This application is also a continuation-in-part of and claims priority to each of the following applications: U.S. application Ser. No. 18/322,279, filed May 23, 2023; U.S. application Ser. No. 18/351,243, filed Jul. 12, 2023; U.S. application Ser. No. 18/216,459, filed Jun. 29, 2023; U.S. application Ser. No. 18/217,201, filed Jun. 30, 2023; U.S. application Ser. No. 18/217,261, filed Jun. 30, 2023; U.S. application Ser. No. 18/217,268, filed Jun. 30, 2023; and U.S. application Ser. No. 18/233,115, filed Aug. 11, 2023, the contents of each of which are expressly incorporated herein by reference.

TECHNICAL FIELD

This disclosure relates to a display system allowing improved real-time mapping of images to be displayed on a target location of such display system, wherein the target location is defined by a rotation and/or translation of the images. Moreover, according to the system and methods described herein, a minimum of memory or storage capacity of the display system is required for such mapping. The disclosure also relates to a corresponding method.

BACKGROUND

Often, in a typical set-up for creative applications, comprising a display or a display system, the idea is to enable movement of such display or display system, or of the images displayed thereon. This movement is understood as, for example, a rotation or a translation, or a combination of both a rotation and a translation. In the art, some solutions are provided to rotate and/or translate images onto a screen. However, in all existing cases, this happens on the level of the entire image or screen, and executed in a central processing of the display system, being, for example, a LED display system which may comprise a plurality of LED tiles.

More specifically, also, rotation of images on, for example, individual LED tiles has already been done by traditional systems. Often, a known display system will have multiple LED tiles, each connected to a central processor. However, according to such traditional systems, the full processing occurs in the central processor of the system and not, for example, on a LED tile level. As traditional receiver cards (as part of the processing) are "dumb", or in other words, they do not have any, or what would be considered very limited amounts of, processing ability, and only receive the data that is meant for all the LEDs, this rotation operation—or other movement such as, e.g., translation operation—is very computationally intensive (and latency susceptible) and requires lots of memory bandwidth or storage capacity.

SUMMARY

Therefore, the inventors of the present application have identified a significant need that exists for fast real-time mapping of images being rotated and/or translated due to, e.g., a display or tile rotation and/or translation, or merely as a creative art application, with a minimum of memory required, in a way that is less computationally intensive, less latency susceptible, and/or that requires less memory bandwidth or storage capacity.

An object of the present disclosure therefore is to provide improved real-time mapping of images to be displayed on a target location of such display system, wherein the target location is defined by a rotation and/or translation of the images, and wherein a minimum of memory or storage capacity of the display system is required for performing such mapping.

In a first aspect, a display system is provided comprising: one or more display units, wherein each of the one or more display units respectively comprises a display tile and a processor, wherein each of the display tiles includes one or more LEE display modules, each of the LEE display modules respectively including an array of a plurality of light-emitting elements (LEEs). Each of the processors is configured, for the respective display tile, to receive position information of at least one of said one or more LEE display modules, receive data to be displayed by the at least one of the one or more LEE display modules, the data having an original location to be displayed to, and to perform a mapping of the data to be displayed to a target location of the at least one LEE display module taking into account the position information of at least one of the one or more LEE display modules.

The position information may comprise radial or polar coordinates, Cartesian coordinates, and/or other coordinates. The position information may comprise information relating to one or more of a rotation, translation, or repositioning of the at least one of the one or more LEE display modules. The position information may comprise at least one position coordinate corresponding to a relative position of at least one LEE within the at least one LEE display module, and also corresponding to an absolute position of the at least one LEE respectively within the display system.

According to an embodiment, each of the processors is configured, for the respective display tile, to further output a display data to the tile of the respective display unit, the display data comprising the data to be displayed modified with the mapping to the target location.

According to an embodiment, in mapping the data to be displayed to the target location, the one or more LEEs are located each at a target position coordinate within the target location.

Each of the one or more display units may comprise a memory having stored therein instructions and/or an algorithm for performing the mapping. Such memory can be respectively provided on the one of the one or more LEE display modules.

The display tile and the processor of each of the one or more display units can be physically coupled together, or can be integrally formed.

Each of the one or more display units may comprise a hub board to which can be coupled the at least one of the one or more LEE display modules and the processor.

Each of the one or more display units can be LED display units, and each of the LEEs can be LEDs.

The data to be displayed may comprise text, images and/or video.

The display system may further comprise a locator for determining a position of the at least one LEE display module of the one or more display tiles.

Each of the display units may comprise a position sensor that respectively determines a position of the at least one LEE display module. Such position sensor may comprise one or a combination of one or more of a microswitch, rocker switch, gyroscope, hall sensor, connector, accelerometer, or photodiode. According to an embodiment, each of the display units may comprise one or more position sensors for respectively determining a position of the at least one LEE display module. Such one or more position sensors could also be one or a combination of one or more of the group as yet mentioned above, i.e. a microswitch, rocker switch, gyroscope, hall sensor, connector, accelerometer, or photodiode.

The display system may comprises a plurality of display units, each of the plurality of display units respectively comprising a display tile and a processor. The plurality of display units may be mounted together, for example adjacent to each other, herewith forming one single (large) display of the display system.

According to an embodiment the display system is a dynamic display system, wherein position information includes information relating to one or more of a rotation, translation, or repositioning of the at least one of the one or more LEE display modules that occurs for different or every frame or image to be displayed, depending on the image that is intended to be displayed, on a video sequence of images, in an automated manner, or based on input from a user or input from an audience or environment.

In another aspect of the invention, an arrangement is provided, comprising a display system in accordance with the first aspect, wherein the display system is movably mounted in the arrangement, and the data to be displayed is automatically mapped to the target location depending on a movement of the display system.

In another aspect, a display system is provided comprising: one or more display units, wherein each of the one or more display units respectively comprises a display tile and a processor, wherein each of the display tiles includes one or more LEE display modules, each of the LEE display modules respectively including an array of a plurality of light-emitting elements (LEEs), wherein each of the processors are configured, for the respective display tile, to receive data to be displayed by the at least one of the one or more LEE display modules, the data having an original location to be displayed to, and perform a mapping of the data to be displayed to a target location of the at least one LEE display module taking into account position information of at least one of the one or more LEE display modules.

Further, in another aspect, a display method is provided for a display system including one or more display units, wherein each of the one or more display units respectively comprises a display tile and a processor, wherein each of the display tiles includes one or more LEE display modules, each of the LEE display modules respectively including an array of a plurality of light-emitting elements (LEEs). The method comprises performing the following steps with the respectively processor of the one or more display units: (i) receiving position information of at least one of the one or more LEE display modules, (ii) receiving data to be displayed by the at least one of the one or more LEE display modules, the data having an original location to be displayed to, and (iii) performing a mapping of the data to be displayed to a target location of the at least one LEE display module taking into account the position information of at least one of the one or more LEE display modules.

In a fifth aspect of the invention, a hardware storage device is provided, having stored thereon computer-executable instructions which, when executed by one or more processors of a display system, configure the one or more processors to perform the method according to the fourth aspect.

A display system, or a display, or even a display unit (e.g. being part of a display or a display system) can be considered "active" when it comprises a processor or processing unit, or a plurality thereof. While referring to U.S. patent application Ser. No. 18/322,279, filed at the USPTO on May 23, 2023 (also referred to by Applicant as "Cluster A—Active Receiver Card" application), such processor can be referred to as or may comprise an active receiver card. Hence, an active display system is for example a display system comprising an active receiver card (or a plurality thereof). As further mentioned in U.S. patent application Ser. No. 18/322,279, the active receiver card comprises a processor, a first and a second interface, wherein (i) the first interface may be configured to receive a serialized video data stream as input from a video processing system, (ii) the processor may be configured to extract a corresponding pixel value from the serialized video data stream, and to perform at least one mathematical operation on the corresponding pixel value.

Whereas the display system (or the display, or the display unit) in accordance with the invention comprises a processor or processing unit, or a plurality thereof, the display system (or the display, or the display unit) can be considered or referred to as "active". Hence, in case of an active light-emitting display system, it is the (plurality of) processor(s) which can make the display system an "active" display system. According to an embodiment, the processor is embedded within an active receiver card, further comprising a first interface and a second interface. The first interface may be configured to receive a serialized video data stream as input from a video processing system, and the processor may be configured to extract a corresponding pixel value from the serialized video data stream, and to perform the at least one mathematical operation on the corresponding pixel value.

The display system in accordance with first aspect of the invention, may comprise digital logic and/or digital circuits, possibly being part of the (plurality of) processor(s), e.g. for performing the at least one mathematical operation. According to an embodiment, and in line with U.S. patent application Ser. No. 18/322,279, digital logic (or a processor, a controller, or other circuitry) may be implemented to determine an (a, b) coordinate pair out of data communicated along the video data stream and compare the (a, b) coordinate with an (x, y) coordinate. The digital logic may also (i) retrieve the corresponding pixel data from the data communicated along the video data stream, (ii) perform at least one mathematical operation on the retrieved data, (iii) convert the outcome of the mathematical operation to logic that can interface with the second electrical interface, and/or (iv) send corresponding signals to the board containing one or more LEDs to light up the LED in correspondence with the outcome of the mathematical operation. In an embodiment, at least one mathematical operation may be performed on the retrieved pixel data. Such operations can include, but are not limited to, correction of the brightness, gamma correction, color correction, or subdelta correction of the display system. Other operations may include a calibration, a content-dependent calibration, a time-dependent calibration, a scaling function, and/or a rotation function. Or, in other words, other operations may include calibrating the display (of the display system) dependent on the content of the digital serialized video data stream or the timing of the stream, and further operations may include scaling or rotation of the video data. According to an embodiment, the display system provides gamma processing.

Whereas a modular tile (e.g. of a display system) or for example its display modules are always smaller compared to the large screen or canvas (e.g. the entire display of a display system), and because of a receiver card, possibly an active receiver card (as described by Applicant in U.S. patent application Ser. No. 18/322,279, filed at the USPTO on May 23, 2023 (also referred to by Applicant as "Cluster A—Active Receiver Card" application)), or—more generally—a processor being provided on a LED tile level, the invention provides a faster computation. The system only needs to compute on its local LED tile level and hence having time needed resulting into less latency to perform such operation.

BRIEF DESCRIPTION OF THE DRAWINGS

FIG. 2a shows the LED tile with the "backpack". FIG. 2b shows the LED tile without the "backpack". FIG. 2c shows the "backpack" opened, but not removed.

FIGS. 4a, 4b, 4c, 4d, 4e, and 4f illustrate examples of devices or equipment that can be used for position determining, herewith for example measuring rotation and/or translation of LED display modules mounted in a LED tile.

DETAILED DESCRIPTION

This patent application builds further on the same Applicant's earlier filed U.S. patent application Ser. No. 16/895,872, filed at the USPTO on Jun. 8, 2020 (which is referred to herein as the "Studio display" application), the contents of which are incorporated herein by reference, and U.S. patent application Ser. No. 17/865,096 (which is referred to herein as the "Studio2" application), filed at the USPTO on Jul. 14, 2022, which claims the benefit of priority to U.S. Provisional Patent Application 63/221,822, which was filed at the USPTO on Jul. 14, 2021, the contents of each of which are incorporated herein by reference. Further, this application also builds on concepts on Applicant's earlier filed U.S. patent application Ser. No. 18/100,198, filed at the USPTO on Jan. 23, 2023 (which is referred to herein as the "Stretch Calibration" application), which is a continuation application from U.S. patent application Ser. No. 16/813,113, filed at the USPTO on Mar. 9, 2020, the contents of each of which are incorporated herein by reference, and which claim the benefit of priority to Belgian Patent Applications BE 2019/5142 filed Mar. 7, 2019, and BE 2019/5196, filed Mar. 28, 2019, the contents of each of which are incorporated herein by reference.

The present disclosure further discloses and focuses on the system and integration of the "on camera feature sets", which means for on-camera use of a display system where the image displayed by the display or display system is captured by one or more cameras (for instance in a studio environment) and herewith taking into account the required specifications. However, particular focus is made on the display system (and not necessarily on the camera, although the camera can be part of embodiments described with the invention), modular in this case, as this is most complex to handle (as compared to non-modular). With modular display system is meant here that just one display can be considered, or a plurality of displays can be combined to appear together as one (large) screen or unity. Hence, the display system can be as small or as big as wanted, or as the particular application of the display system requires. Nevertheless, it can also be done on non-modular displays, for example, one single display to be used as such (e.g., standalone), not in combination with other displays. A system and a method for implementing the system are disclosed in relation to, for example, autorotation detection of one or more LED display modules of a LED display system (comprising a plurality of such LED display modules), and equally autotranslation detection of LED display modules, a combination of autorotation and autotranslation, and/or any other relocation, repositioning, or change of location, position or alignment detection of one or more LED display modules of a LED display system or any other light emitting element (LEE) system.

Figure 1:
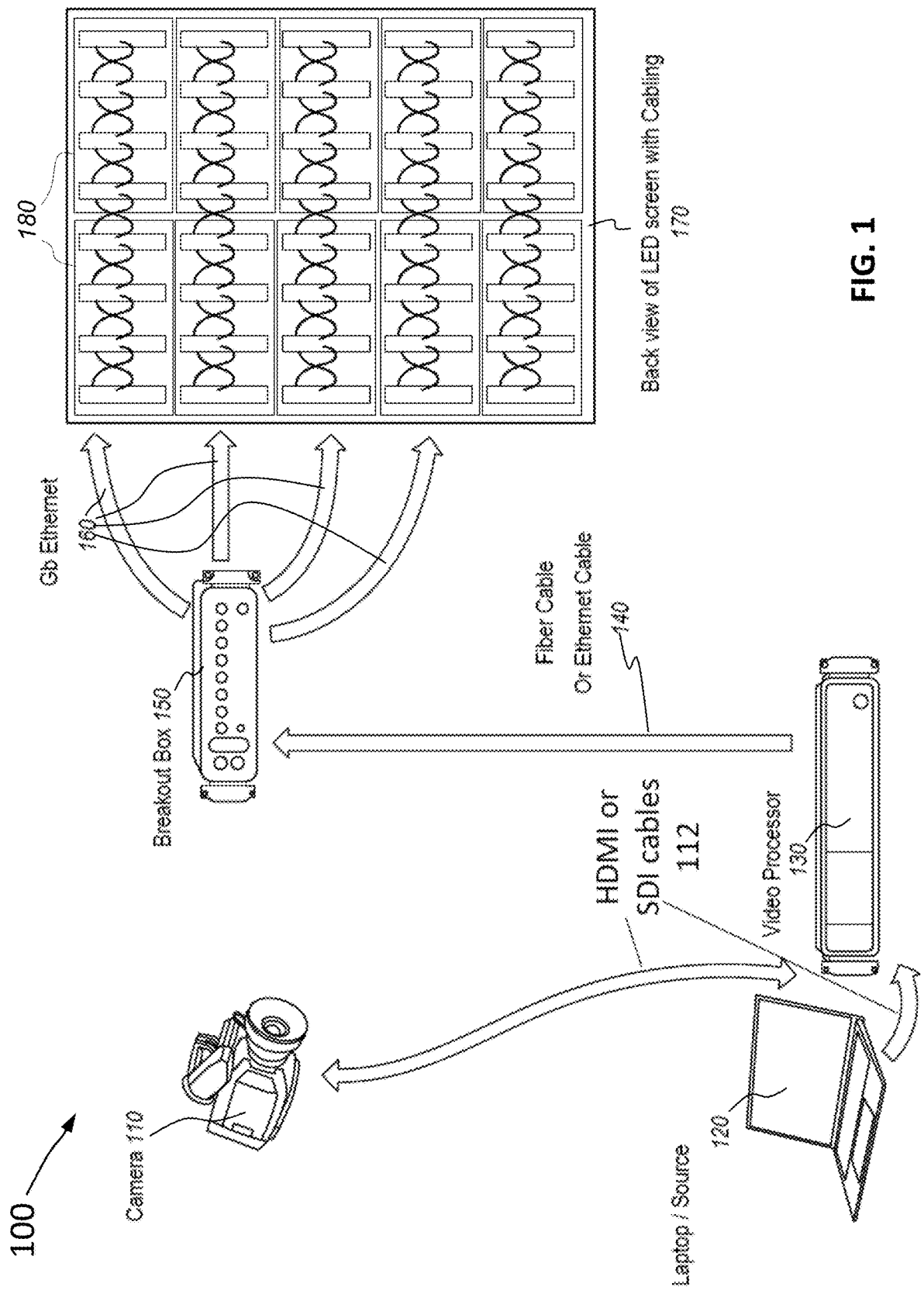
FIG. 1 illustrates a system passing video data to an array of LED display tiles.

FIG. 1 illustrates a system 100 wherein video data is passed to an array of LED display tiles 180 as part of a LED screen 170. Related LED systems in general are currently based upon similar system topologies. A video processor 130 takes in the desired video image from a camera 110 or computer source 120, such as a laptop, based upon, for example, HDMI or SDI cables 112. The video processor 130 performs one or more calculations and/or remapping functions onto this original image and puts it over an ethernet or an ethernet-like cable or fiber cable 140, usually also performing compression before it sends the ethernet or ethernet-like signal to a breakout box 150. Dependent on the LED tile 180 resolution and available bandwidth, one needs to calculate manually how many LED tiles 180 one can connect in loop from one cable coming from one output of the breakout box 150. Numerous ethernet cables 160 are distributed over a several amount of LED tiles 180.

Figure 2C:
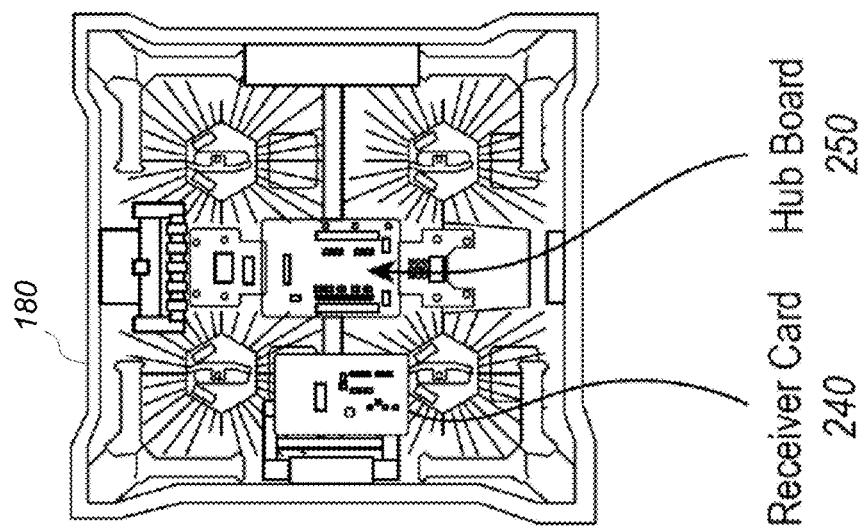
FIGS. 2a, 2b, and 2c illustrate and present a rear side of an LED tile as used in related systems and nomenclature thereof.
Figure 2B:
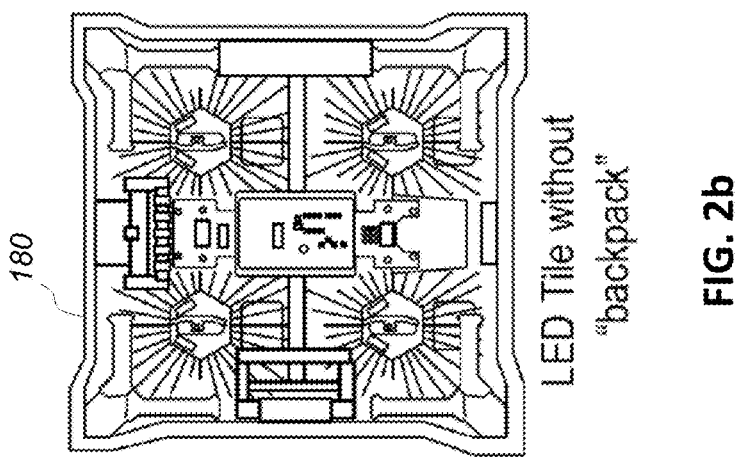
Figure 2A:
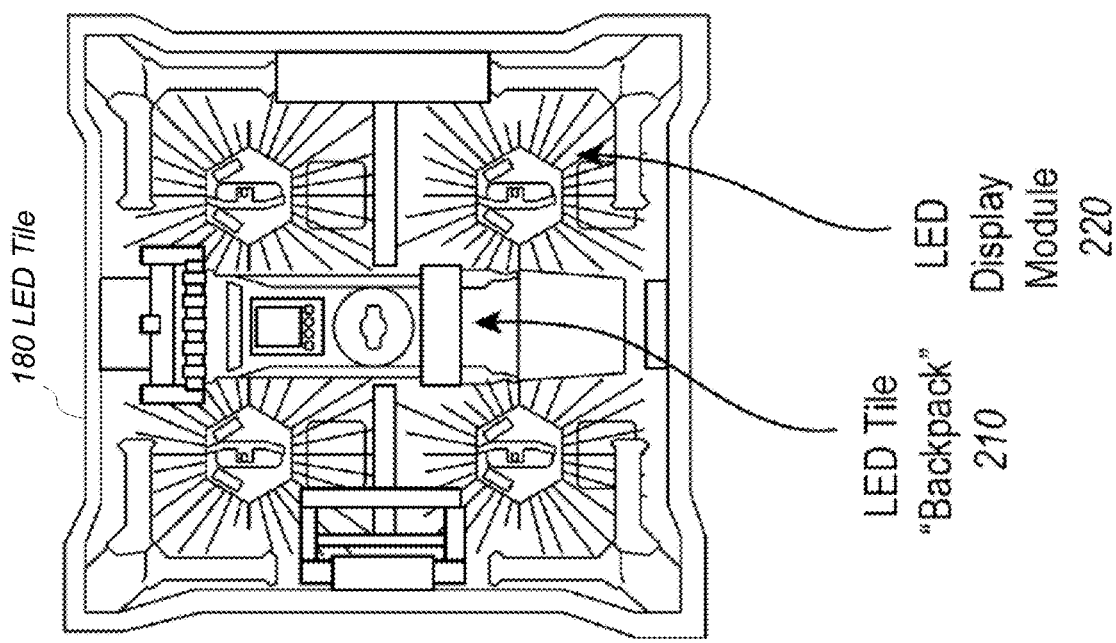

FIGS. 2a-2c illustrate and present the rear side of an LED tile 180 as used in related systems and nomenclature thereof. FIG. 2a shows the LED tile 180 with the "backpack" 210, which contains the receiver card 240 (not shown, see FIG. 2c wherein it is indicated), still connected to the electrical interfaces of the LED tile 180, which includes the hub board 250 (not shown, see FIG. 2c wherein it is indicated). One of the LED display modules 220 is indicated in FIG. 2a. By means of example, here, the LED tile 180 comprises four LED display modules 220. FIG. 2b shows the LED tile 180 without the "backpack" 210, thus exposing the hub board 250 underneath. FIG. 2c shows the "backpack" 210 opened, but not removed, exposing the receiver card 240 on the "backpack" 210 and the hub board 250 on the LED tile 180.

Figure 3:
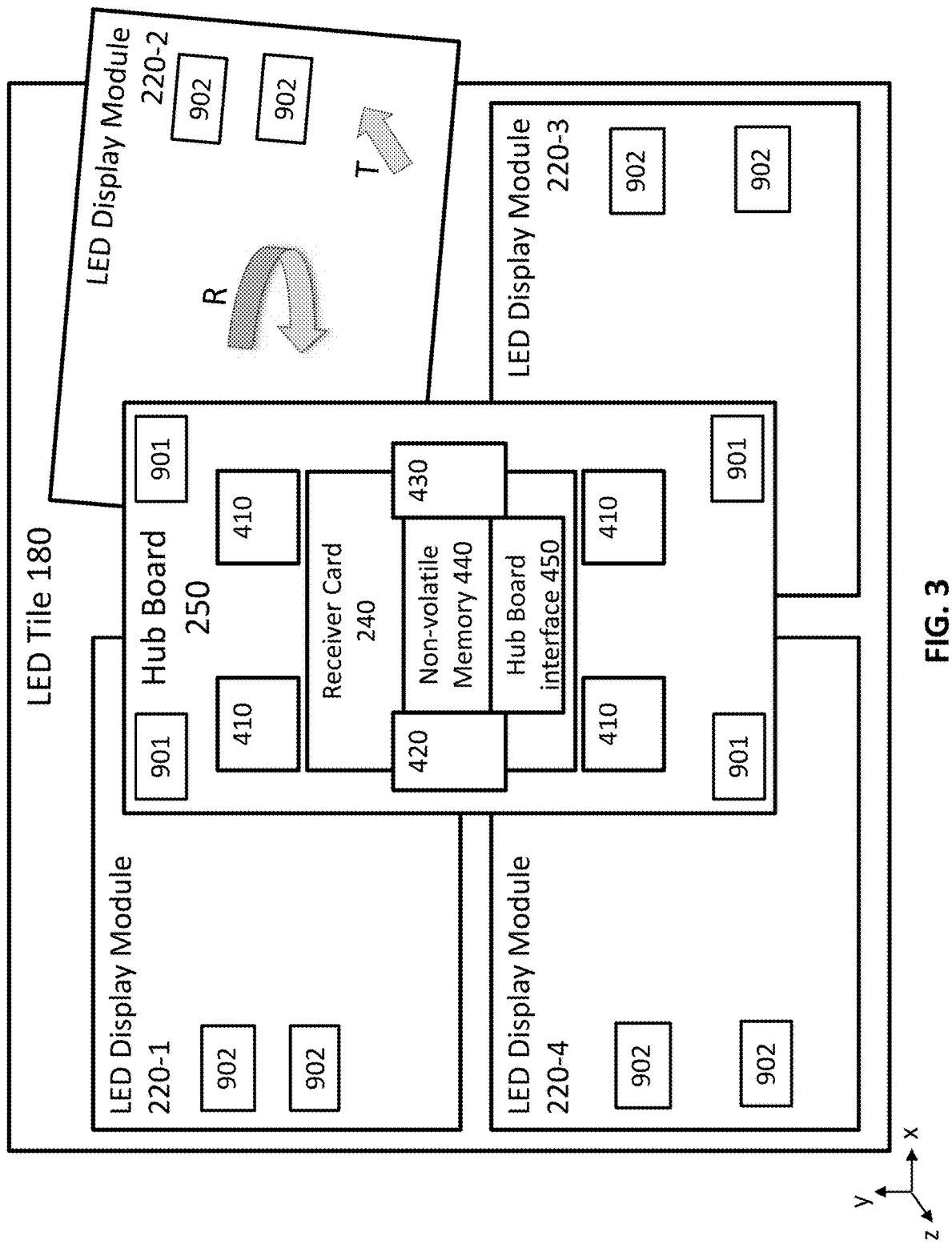
FIG. 3 illustrates an embodiment of a LED tile configuration, in accordance with the invention.

FIG. 3 illustrates how related LED tiles 180 are typically configured. A number of LED display modules 220 (also called LDMs—which are LED boards with usually a simple mechanical housing) are plugged into a mechanical frame and electrical contact is made with a "hub board" or "hub card" 250. Here, in the embodiment of FIG. 3, four LDMs 220 are shown (e.g., LDM 220-1, 220-2, 220-3, 220-4 . . . 220-n), but the number of LDMs may be more or less than four. The hub board 250 is in fact an electrical interface between the LDMs 220, a power supply, and ethernet (RJ45) cable ports 420, 430 and the receiver card 240. However, these cable ports 420, 430 are not limited to connecting just ethernet cables, which are simply provided here as an example. Other types of cabling may be used to connect to the receiver card depending on the receiver card's 240 architecture. The receiver card 240 is the heart of the LED tile 180 and contains the logic for driving the LEDs of the LDMs 220. The LDMs 220-1, 220-2, 220-3, 220-4 usually have a multiplexing layout wherein LEDs are connected on one side to the multiplexing and on the other side to CCDs or constant current drivers (or current sources).

Figure 7:
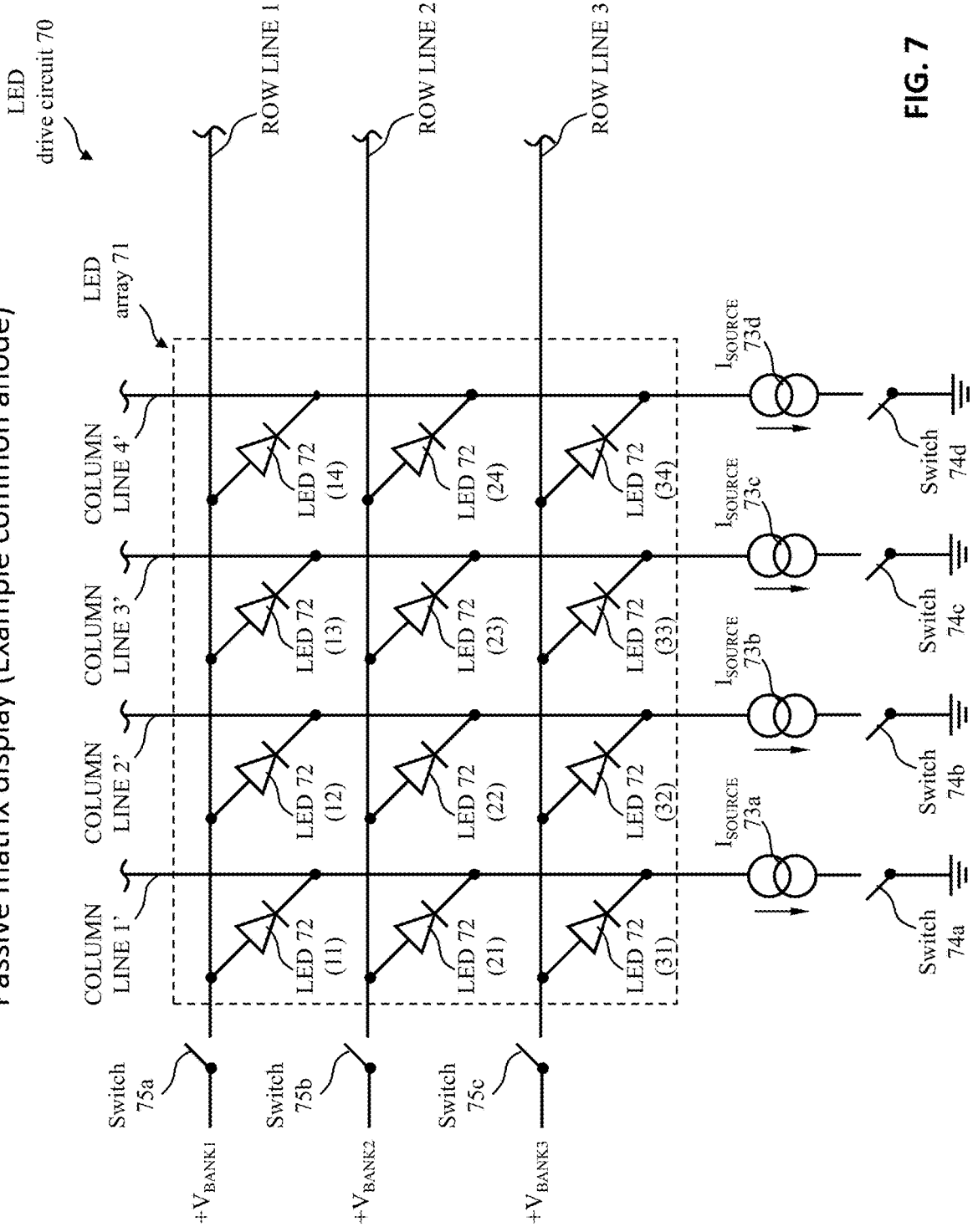
FIG. 7 shows a schematic diagram of a related common anode LED drive circuit.

In a passive matrix display, pixels are addressed row by row, which is called time multiplexing. This means that all pixels on row 1 (or first row) are updated first, then all pixels on row 2 (or second row), etc. meaning that for a display with three rows, each row is only addressed ⅓ of the total time. FIG. 7 shows a picture embodiment of a related multiplexing schematic used for LEDs within a display matrix. A LED drive circuit 70 for a LED display is represented, comprising multiple LEDs 72 arranged on a horizontal and vertical grid, i.e. in a LED array 71. Each of the LEDs 72 are indicated with their respective position in the LED array 71 (between brackets), e.g. on position 'first row, first column' the LED 72 is indicated with '11' between brackets. Within the LED drive circuit 70, the LEDs 72 are sharing a common anode in the same row or row line 1, 2, 3 via which they are driven by power supply Vbank1, Vbank2, Vbank3, and sharing a (constant current) driver 73a, 73b, 73c, 73d per column or column line 1', 2', 3', 4'. A positive voltage is electrically connected to each respective row 1, 2, 3 via a plurality of switches 75a, 75b, 75c. The LED drive circuit 70 comprises a plurality of drivers or current sources 73a, 73b, 73c, 73d, such as for example current source 73a which may be coupled to column 1' via a switch 74a. By analogy, other current source 73b, 73c, 73d may be coupled via respective switch 74b, 74c, 74d. Each LED 72 has an anode and a cathode. In general, the LED display comprises an electronical interface, and electronics to light up the individual LEDs 72, and is controlled by signals on the electronical interface. The electronical interface can be defined by a LED drive circuit 70 having electrical connections, here in FIG. 7 defined by rows 1, 2, 3 and columns 1', 2', 3', 4' that electrically connect to the LEDs 72 in the LED array 71. Related LEDs in display applications are generally driven using a passive matrix structure, herewith referring for example to the common anode principle, although common cathode is also possible. Applying multiplexing within the passive matrix LED display, will result in lots of connections. FIG. 7 illustrates the electrical connections for a 3 by 4 pixel display.

Although LED displays and LED tiles are described as an embodiment herein, with their respective LED display modules or LDMs 220 above and below, the concepts of this disclosure may also be implemented or applied with most or other types of displays—especially those that are configured to display images based on an array of pixels and their respective pixel data or light emitting elements (LEEs) and corresponding LEE display modules. For example, Liquid Crystal Displays (LCDs) implement an array of pixels like that of an LED display. Other examples of displays implementing an array of pixels would be resistive or capacitive touch displays such as those used in smart devices and even Cathode-Ray Tube (CRT) displays. More examples, although inherently included as LED displays, are Active Matrix Organic Light Emitting Diode (AMOLED) displays, Organic Light Emitting Diode (OLED) displays, Full-array LED displays, Mini-LED displays, Micro-LED displays, Quantum LED (QLED) displays, Quantum Dot-OLED (QD-OLED) displays, and more. As used herein, an array may be considered to be two or more LEEs arranged in spatial arrangement to each other, such as a rectangular, square, or other geometric arrangement to each other, in a pattern or non-patterned relationship.

Also shown in FIG. 3 are the wired and/or wireless connections 410 to the hub board 250. These connections 410 provide access points to additional hardware such as gyroscopes, accelerometers, and much more. Additionally, non-volatile memory 440 is provided on the receiver card 240. The receiver card 240 interfaces with the hub board 250 via the hub board interface 450 built into the receiver card 240.

The receiver card 240 may be considered a "smart" or active receiver card in that the receiver card has processing ability, such as an internal processor and/or digital logic. As used herein and throughout this disclosure, a processor, or what may be "digital logic" or "a process unit" is used to refer generally to what is understood to be hardware digital logic, digital logic circuitry, control circuitry, or other circuitry or controlling circuitry, a microprocessor, or one or more processors, controllers or computing devices, based on software or circuitry, that operate based on received or stored instructions, such hardware being formed of one or more integrated circuits or otherwise, which may be implemented on a single metal-oxide-semiconductor integrated circuit chip or otherwise, which may include electronic components, for example, transistors, diodes, resistors, gates, relays, switches, amplifiers, inverters, buffers, and/or capacitors, etc., that are used to receive, process, perform logical operations on, mathematical operations, algorithmic operations, calculations, and/or store signals, data, and/or information, including digital and/or analog signals, or continuous or non-continuous signals, and output one or more signals based thereon. Although a hub board 250 is shown in the embodiment of FIG. 3, the receiver card 240 or a processor or processing device may perform the above-described processing without necessarily requiring the hub board 250 and may be in direct—either wired or wireless—connection with the LED Display Modules 220-1, 220-2, . . . 220-n.

According to an embodiment, any of the LED display modules or LDMs 220-1, 220-2, 220-3, 220-4 comprised in a LED tile 180 can be rotated, translated, and/or otherwise repositioned in relation to the LED tile 180, or e.g. its frame in particular. By means of example, in FIG. 3 the upper right LED module 220-2 is shifted and rotated as indicated by the arrows T (for translation or shift) and R (for rotation). Hence, in order to enable this shifting and/or rotating (translating, rotation, or otherwise repositioning) of an LDM, the connection 410 has to be a wired connection or wireless connection as earlier referred to. According to an embodiment, only one LED display module comprised in a LED tile is rotated, translated, and/or otherwise repositioned in relation to the LED tile, or e.g. its frame in particular. According to another example, more than one LED display module comprised in a LED tile is rotated, translated, and/or otherwise repositioned in relation to the LED tile, or e.g. its frame in particular. And according to another embodiment, on a global level, the LED tile can also be rotated.

In the lower left corner of FIG. 3, x,y,z-coordinates are given to facilitate further description. Means or equipment 901, 902 is provided so that the actual (x,y) translation and/or rotation (around the z-axis) or other repositioning can take place, and thus for enabling the translation and/or rotation or other repositioning. In other words, the LED tile 180 needs to determine position of its individual LED boards (or LDMs 220-1, 220-2, 220-3, 220-4). Position is here related to z-axis rotation and/or (x,y) translation coordinate. According to an embodiment, systems (or e.g., LED tiles) hold at least one (x,y) coordinate on the video canvas, for example, for the upper left corner. When the LED tile (or e.g. its processor) knows the size and amount of LEDs on each LED display module, it can calculate the (x,y) position of each of the LEDs on the video canvas. In the example shown in FIG. 3, the translation or repositioning, or even the rotating may be described in x,y coordinates or even x,y,z coordinates of a Cartesian system. However, in another embodiment, the translation, rotation, and/or other repositioning of the LDM may be described using other coordinate systems, such as a radial or polar coordinate system. In another embodiment, the translation, rotation, and/or other repositioning of the LDM may be described using a spherical coordinate system, a cylindrical coordinate system, a perifocal coordinate system, curvilinear coordinates, or a combination of one or more of such coordinate systems.

FIGS. 4a to 4f illustrate different examples or embodiments of devices or equipment that can be used for position determination. According to an embodiment, the position determination is performed for one or more of the LED display modules comprised in the LED tiles, which all together forming a LED screen (or LED display). Determining position can be done by, e.g., using position or location switches such as microswitches 41, as shown in FIG. 4a, that may be provided on either of the hub board 250 or on the LED boards. A microswitch, also known as a miniature snap-action switch, is an electric switch that is actuated by very little physical force, through the use of a tipping-point mechanism. Switching occurs at specific and repeatable positions of the actuator. A relatively small movement at the actuator button produces a relatively large movement at the electrical contacts, which occurs at high speed (regardless of the speed of actuation). Microswitches are very common due to their low cost but high durability (up few millions of cycles). When multiple switches are used, then one can determine what switch has been pushed and which one remained unchanged. As shown in FIG. 4b, a rocker switch 42 or a switch that has multiple positions can also be used. A rocker switch is characterized in that the switching part of the mechanism rocks between two or more positions when pressed. Each position could be an indicator for rotation or translation. For example at position "0"=0° rotation being indicated, at position "1"=90°, at position "2"=180°, and at position "3"=270°, whereas at position "4"=x+10 a translation may be indicated, and at position "5"=y+10, another translation may be indicated, for example. Further, a three axis MEMS digital gyroscope 43 can also be used, as shown in FIG. 4c that e.g. resides on the LED board. A gyroscope can determine the rotation. Moreover, a gyroscope can measure the rate at which the gyroscope or sensor is rotating, called angular velocity. According to an embodiment, a gyroscope resides on the LED boards (for example, may be provided on each LED board or LED display module) and means for reading the rotation measured with the gyroscope are as well available. In practice, for example, signals are transferred from the gyroscope to (neighboring) connection 410 such that the active LED processing system (of the receiver card 240) can read and interpret what has been measured. It is further noted that in case the LED tile can be rotated, such rotation could also be detected for example by using a MEMS gyroscope. Alternatively, as further illustrated in FIG. 4d, a magnet and hall sensor combination 44 can also be used. For example, for a simple rotation such as 0°, or 90°, one can put e.g. one magnet on each LED board 220 in a corner of the LED board 220, and four hall sensors on the hub board 250, i.e. one hall sensor on each corner of the hub board 250. Preferably, the magnet is provided in a LED board corner, in particular in the vicinity of the hub board 250, and more particularly close to one of the hub board corners where one of the hall sensors is provided. (It is assumed that the hub board significantly covers the area below, herewith sufficiently covering part of the LED boards where the magnets are provided). According to that particular hall sensor that detects proximity of a magnet of one of the LED boards, one can determine the rotation of this LED board. A further alternative for position determination is a connector 45 as shown in FIG. 4c that can be plugged in "normally", but can also be "reversely" plugged in. By assigning for example two signals to the connector 45, i.e. one for the "normally" plugged in situation and one for the "reversely" plugged in connector, one can determine for example if the rotation is 0° or 180°. Note this can also be accomplished by e.g. a rectangular connector and assigning one pin to a particular signal (e.g. voltage), wherein the receptacle (receiving the pin of the connector) detects location (or position of the pin) according to the value of that particular signal (e.g. 0V or 5V voltage). According to the location (or position of the pin) in the receptacle, the particular signal is seen or not (i.e. voltage present or not), and hence rotation can also be determined (in relation to the amount of voltage being detected). Finally, in FIG. 4f a photodiode and LED combination 46 is presented. According to this embodiment, for example, both photodiode and LED can be placed four fold on the hub board 250 according to corner locations of a particular LDM 220, in order to elaborate a light emitter-receiver concept for detecting light pathway changes and/or interruptions and herewith determining (changes in) position and/or rotation. The LED display module 220 may have one corner that on the back side is very reflective. If also on the hub board 250, the four corresponding corner-locations contain a LED/photodiode combination, the place where reflection is highest determines the rotation of the LDM 220. Alternatively, the LDM 220 can e.g. contain one LED at the back (in a defined corner) and if at the hub board 250 in the corresponding corners there is a photodiode, one can also determine the rotation. Similarly if there's an array of LED/photodiode combinations, one can also define (x,y) offset.

Figure 5:
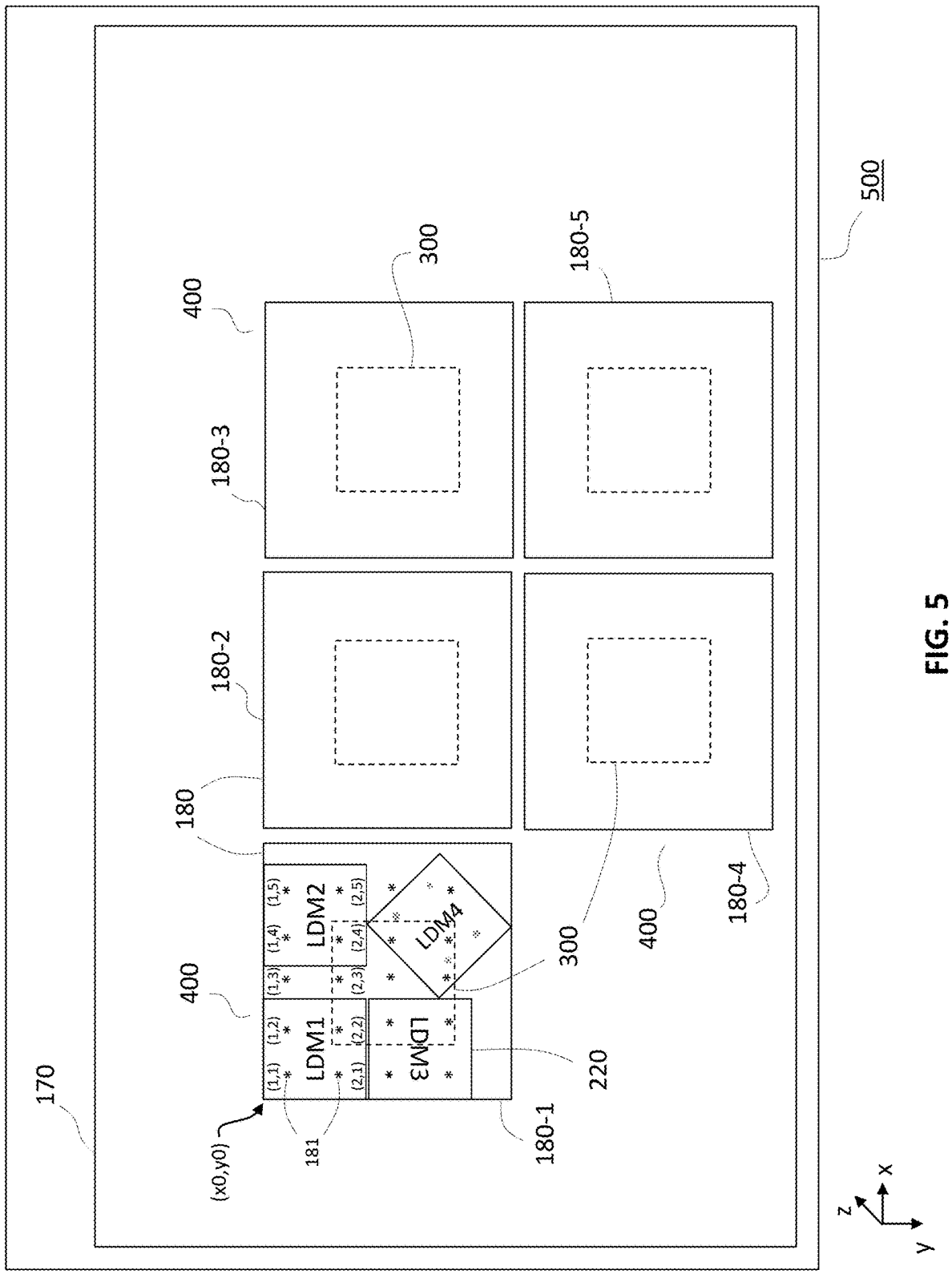
FIG. 5 illustrates an embodiment of a LED display system comprising a LED video screen, the LED video screen comprising a plurality of LED tiles, in accordance with the invention, wherein real-time mapping of images to be displayed on a target location of the LED video screen is performed, and wherein the target location is defined by a rotation and/or translation of the images.

FIG. 5 shows a LED display system 500 comprising a LED display or screen 170, or video canvas. An x,y,z-coordinate system (slightly different from the one in FIG. 3) is again given to facilitate further description. The LED video screen 170 is, for example, configured for video images being of 1920×1080 pixels, wherein 1920 is the number of pixels along horizontal x-axis and 1080 is the number of pixels along vertical y-axis. The LED video screen 170 comprises a plurality of LED tiles 180, e.g. 180-1, 180-2, 180-3, 180-4, 180-5, of which a subportion are shown in FIG. 5. For one of the LED tiles 180-1, individual pixels 181 are also shown. The LED tile position in the screen is, or starts at (x0, y0). The LED tile 180-1 comprises in this example or embodiment four LED display modules 220 or LDMs: LDM1, LDM2, LDM3 and LDM4. The LED tile 180-1 as considered here, can also be seen as an array or matrix comprising four rows and five columns of LEDs or pixels. As known in the art, if there are 4 rows and 5 columns, it is called a 4×5-matrix. For the first two rows of the LED tile 180-1, the positions of the LEDs or pixels 181 are indicated in FIG. 5, between brackets. For example, for the first row of the LED tile 180-1, there are pixels 181 at positions (1, 1), (1, 2), (1, 3), (1, 4) and (1, 5) respectively, wherein (1, 1) meaning first row and first column of the LED tile 180-1, and (1, 2) meaning first row and second column of the LED tile 180-1 etc. Assume all LDMs comprise a 2×2 LED array, then LDM1 maps to (x0, y0) for upper left LED at LED tile array position (1, 1), and upper right LED maps to (x0+1, y0) at LED tile array position (1, 2). Bottom left LED maps to (x0,y0+1) at LED tile array position (2, 1) and bottom or lower right LED maps to (x0+1, y0+1) at LED tile array position (2, 2). LDM2 has been detected by having offset of one pixel (along vertical direction) at array positions (1, 3) and (2, 3) respectively, hence mapping (in same order as LDM1, i.e. from upper left to bottom right) (x0+3, y0); (x0+4, y0);(x0+3, y0+1) and (x0+4, y0+1) at LED tile array positions (1, 4), (1, 5), (2, 4) and (2, 5) respectively. In other words, the image of LDM2 has to be shifted back for one pixel (along vertical direction) (said shift back position can be defined as a target position), in order to still visualize or display what was originally intended to show, before LDM2 was translated and detected with the offset of one pixel (along vertical direction). LDM3 is rotated for 180° (hence, being now upside down) and we can see the original upper left LED thereof is now the bottom right LED on the canvas. So this LED needs to map to (x0+1, y0+3) and so on. In other words, the image of LDM3 has to be rotated for 180° (which can be defined as a target position), in order to still visualize or display what was originally intended to show, before LDM3 was rotated. For LDM4 there is an arbitrary position (rotated and/or shifted) and computation has to be performed, for example, by using interpolation to determine the value of its upper left corner. In this case it could be an average between (x0+3, y0+2) and (x0+4, y0+2). In short, according to the begin position (x0, y0) of the LED tile 180-1 and each of the individual LDM sizes and shapes, this could be an array of pixels of e.g. 16×8 pixels. However, it could also be an arbitrary shape of which each relative position of the individual LEDs on that particular (shaped) LDM is known, for example, being stored in memory.

Each of the LED tiles 180 can be provided with a processor 300, as indicated with dashed square in FIG. 5. A LED tile 180 being provided with such processor 300, together can also be referred to as a display unit 400, as depicted in FIG. 5. As depicted here, the LED display 170 is gathering the LED display units 400, however, according to an embodiment, or more generally, a display system may comprise the display units without (the need of) collecting them in or assigning them to a common display.

The processor 300 or processing system, e.g. comprised in the receiver card (for example, a receiver card 240 as shown in the embodiments of FIGS. 2 and 3) of corresponding LED tile 180, can then calculate from the canvas which information is needed to retain and perform mathematical operations on it to send the final value to corresponding LEDs. That is, in contrast to current or relevant systems, wherein full processing occurs in a central processor of the system, in the system and method disclosed herein, more than one, some, most, or indeed, in a preferred embodiment, all LDMs 220, i.e. for example the processor 300 or the receiver card 240 connected to the LDMs 220 in particular, will then calculate from the canvas which information is needed to retain and perform mathematical operations on it to send the final value to corresponding LEDs. At first glance, this might seem as less cost effective. But the impact on performance is immense, as this non-centralized approach enables a performance of (many) more or faster calculations, with less susceptibility to latency, and requiring far less memory bandwidth or storage capacity.

Figure 6:
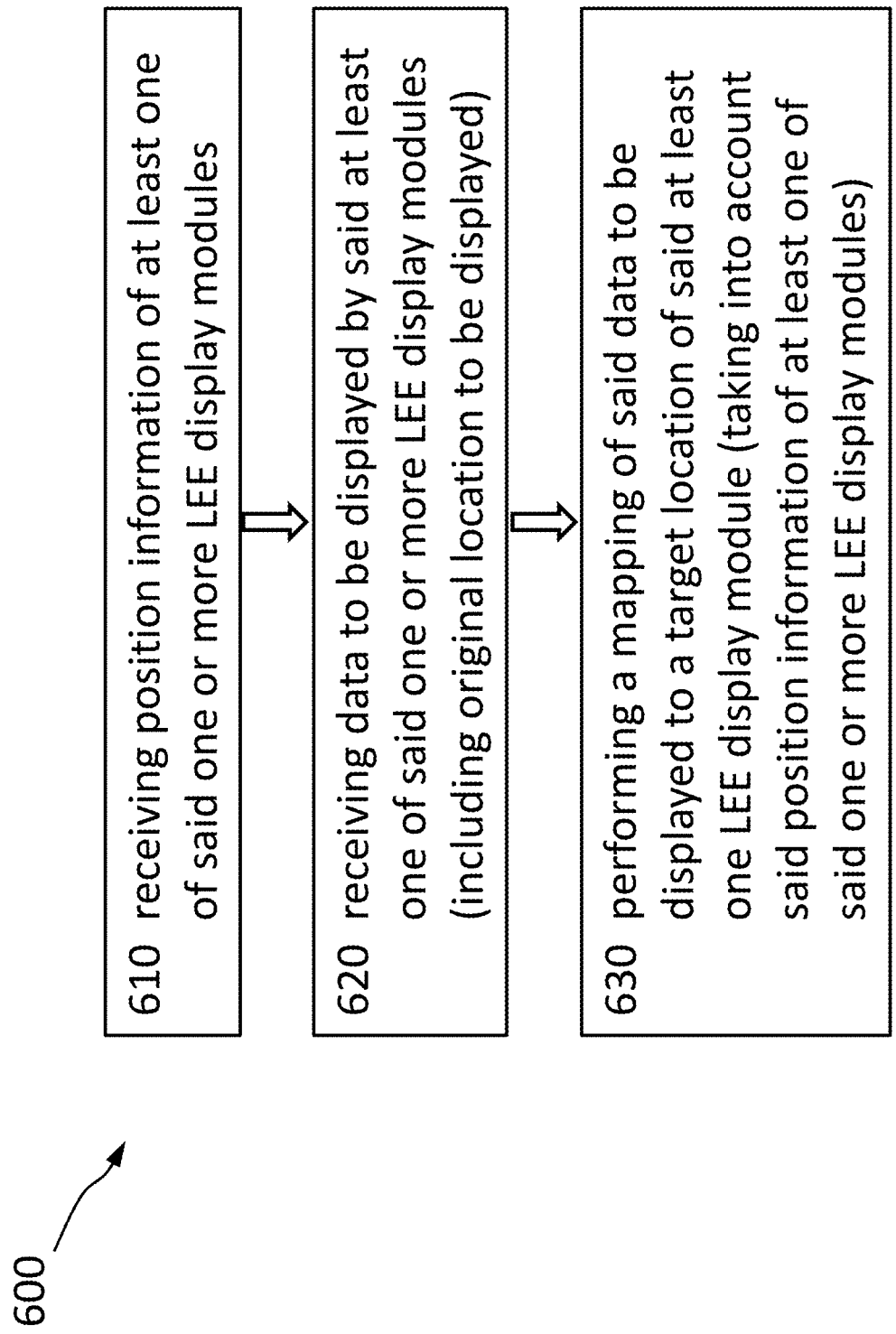
FIG. 6 illustrates a flowchart embodiment, in accordance with the invention, describing a method for performing real-time mapping of images to be displayed on a target location of a display system, wherein the target location is defined by a rotation and/or translation or other repositioning of the images, of which the result is for example illustrated in FIG. 5.

FIG. 6 illustrates a flowchart embodiment, in accordance with the invention, describing a method 600 for performing real-time mapping of images to be displayed on a target location of a display system, wherein the target location is defined by a rotation and/or translation or other repositioning of the images, of which the result is for example illustrated in FIG. 5. The display system comprises one or more display units, wherein each of the one or more display units respectively comprises a tile and a processor. Each of the tiles comprises one or more LEE display modules, wherein each of the LEE display modules respectively comprises an array of a plurality of light-emitting elements (LEEs).

In the method, performed within the respective processors of each of the tiles of the display system: in a first step, at 610, position information of at least one of the one or more LEE display modules is received by the processor; in a second step, at 620, data to be displayed by the at least one of the one or more LEE display modules is received by the processor, wherein the data having an original location to be displayed to; and in a third step, at 630, a mapping is performed by the processor of the data to be displayed to a target location of the at least one LEE display module taking into account the position information of at least one of the one or more LEE display modules. The processor then transmits, via wire transmission or wireless transmission, to the respective at least one of the one or more LEE display modules a display signal or display data including the mapping of the data to be displayed to the target location. In another example, the position information received by the processor is provided by a position determining sensor that determines the position of the LEE display module. In another example, the position the position information of the at least one of the one or more LEE display modules is provided to the processor with the data to be displayed. In another example, the position information is received from the processor from a central device that transmits the data to be displayed to the processor. In another example, the central device is a central video processing device. In yet another example, the position information is transmitted to the processor in the same data stream as the data to be displayed and/or in a different or separate data transmission, signal, or stream.

Combinability of Embodiments and Features

This disclosure provides various examples, embodiments, and features which, unless expressly stated or which would be mutually exclusive, should be understood to be combinable with other examples, embodiments, or features described herein.

In addition to the above, further embodiments and examples include the following:

According to a first group of embodiments:

1. A display system comprising: one or more display units, wherein each of the one or more display units respectively comprises a display tile and a processor, wherein each of the display tiles includes one or more LEE display modules, each of the LEE display modules respectively including an array of a plurality of light-emitting elements (LEEs), wherein each of the processors are configured, for the respective display tile, to receive position information of at least one of said one or more LEE display modules, receive data to be displayed by said at least one of said one or more LEE display modules, said data having an original location to be displayed to, and perform a mapping of said data to be displayed to a target location of said at least one LEE display module taking into account said position information of at least one of said one or more LEE display modules.

2. The display system according to any one or a combination of any two or more of 1 above and 3-22 below, wherein said position information includes radial coordinates or Cartesian coordinates.

3. The display system according to any one or a combination of any two or more of 1-2 above and 4-22 below, wherein said position information includes information relating to one or more of a rotation, translation, or repositioning of the at least one of said one or more LEE display modules.

4. The display system according to any one or a combination of any two or more of 1-2 above and 4-22 below, wherein each of the processors are configured, for the respective display tile, to further output a display data to said tile of the respective display unit, said display data including said data to be displayed modified with said mapping to the target location.

5. The display system according to any one or a combination of any two or more of 1-4 above and 6-22 below, wherein in mapping said data to be displayed to the target location, said one or more LEEs are located each at a target position coordinate within said target location.

6. The display system according to any one or a combination of any two or more of 1-5 above and 7-22 below, wherein said position information includes at least one position coordinate corresponding to a relative position of at least one LEE within said at least one LEE display module, and also corresponding to an absolute position of the at least one LEE respectively within said display.

7. The display system according to any one or a combination of any two or more of 1-6 above and 8-22 below, wherein each of the one or more display units includes a memory having stored therein instructions and/or an algorithm for performing said mapping.

8. The display system according to any one or a combination of any two or more of 1-7 above and 9-22 below, wherein said memory is respectively provided on said one of said one or more LEE display modules.

9. The display system according to any one or a combination of any two or more of 1-8 above and 10-22 below, wherein said display tile and said processor of each of the one or more display units are physically coupled together.

10. The display system according to any one or a combination of any two or more of 1-9 above and 11-22 below, wherein said display tile and said processor of each of the one or mor display units are integrally formed.

11. The display system according to any one or a combination of any two or more of 1-10 above and 12-22 below, wherein each of the one or more display units includes a hub board to which are coupled the said one of said one or more LEE display modules and the processor.

12. The display system according to any one or a combination of any two or more of 1-11 above and 13-22 below, wherein the data to be displayed includes text, images and/or video.

13. The display system according to any one or a combination of any two or more of 1-12 above and 14-22 below, wherein each of said one or more display units are LED display units and each of the LEEs are LEDs.

14. The display system according to any one or a combination of any two or more of 1-13 above and 15-22 below, further comprising a locator for determining a position of said at least one LEE display module of said one or more display tiles.

15. The display system according to any one or a combination of any two or more of 1-14 above and 16-22 below, wherein each of the display units includes a position sensor that respectively determines the position of said at least one LEE display module.

16. The display system according to any one or a combination of any two or more of 1-15 above and 17-22 below, wherein the position sensor includes one or a combination of one or more of a microswitch, rocker switch, gyroscope, hall sensor, connector, accelerometer, or photodiode.

17. The display system according to any one or a combination of any two or more of 1-16 above and 18-22 below, wherein the display system comprises a plurality of display units, each of the plurality of display units respectively comprising a display tile and a processor.

18. The display system according to any one or a combination of any two or more of 1-17 above and 19-22 below, wherein said display system is a dynamic display system, wherein position information includes information relating to one or more of a rotation, translation, or repositioning of the at least one of said one or more LEE display modules that occurs for different or every frame or image to be displayed, depending on the image that is intended to be displayed, on a video sequence of images, in an automated manner, or based on input from a user or input from an audience or environment.

19. An arrangement comprising the display system according to any one or a combination of any two or more of 1-18 above and 20-22 below, wherein said display system is movably mounted in said arrangement, and said data to be displayed is automatically mapped to said target location depending on a movement of said display system.

20. The display system according to any one or a combination of any two or more of 1-19 above and 21-22 below, further comprising digital logic within said processor of said at least one hub board, the digital logic being configured to convert said data to be displayed to logic that can be interfaced with said at least one LEE display module.

21. The display system according to any one or a combination of any two or more of 1-20 above and 22 below, wherein said at least one LEE display module is arranged in one or more display tiles within said display.

22. The display system according to any one or a combination of any two or more of 1-21 above, wherein said one or more display tiles or are configured to be rotated, translated, and/or repositioned.

According to a second group of embodiments:

1. A processor for a display system, the display system having one or more display units, wherein each of the one or more display units respectively comprises a display tile and a processor, wherein each of the display tiles includes one or more LEE display modules, each of the LEE display modules respectively including an array of a plurality of light-emitting elements (LEEs), the processing system being configured, for the respective display tile, to receive position information of at least one of said one or more LEE display modules, receive data to be displayed by said at least one of said one or more LEE display modules, said data having an original location to be displayed to, and perform a mapping of said data to be displayed to a target location of said at least one LEE display module taking into account said position information of at least one of said one or more LEE display modules.

2. The processor according to any one or a combination of any two or more of 1 above and 3-22 below, wherein said position information includes radial coordinates or Cartesian coordinates.

3. The processor according to any one or a combination of any two or more of 1-2 above and 4-22 below, wherein said position information includes information relating to one or more of a rotation, translation, or repositioning of the at least one of said one or more LEE display modules.

4. The processor according to any one or a combination of any two or more of 1-3 above and 5-22 below, wherein the processors is configured, for the respective display tile, to further output a display data to said tile of the respective display unit, said display data including said data to be displayed modified with said mapping to the target location.

5. The processor according to any one or a combination of any two or more of 1-4 above and 6-22 below, wherein in mapping said data to be displayed to the target location, said one or more LEEs are located each at a target position coordinate within said target location.

6. The processor according to any one or a combination of any two or more of 1-5 above and 7-22 below, wherein said position information includes at least one position coordinate corresponding to a relative position of at least one LEE within said at least one LEE display module, and also corresponding to an absolute position of the at least one LEE respectively within said display.

7. The processor according to any one or a combination of any two or more of 1-6 above and 8-22 below, further comprising a memory having stored therein instructions and/or an algorithm for performing said mapping.

8. The processor according to any one or a combination of any two or more of 1-7 above and 9-22 below, wherein said memory is respectively provided on said one of said one or more LEE display modules.

9. The processor according to any one or a combination of any two or more of 1-8 above and 10-22 below, wherein said display tile and said processor of each of the one or more display units are physically coupled together.

10. The processor according to any one or a combination of any two or more of 1-9 above and 11-22 below, wherein said display tile and said processor of each of the one or mor display units are integrally formed.

11. The processor according to any one or a combination of any two or more of 1-10 above and 12-22 below, wherein each of the one or more display units includes a hub board to which are coupled the said one of said one or more LEE display modules and the processor.

12. The processor according to any one or a combination of any two or more of 1-11 above and 13-22 below, wherein the data to be displayed includes text, images and/or video.

13. The processor ording to any one or a combination of any two or more of 1-12 above and 14-22 below, wherein each of said one or more display units are LED display units and each of the LEEs are LEDs.

14. The processor according to any one or a combination of any two or more of 1-13 above and 15-22 below, wherein the display system further comprises a locator for determining a position of said at least one LEE display module of said one or more display tiles, and the processor is configured to receive said position information from said locator.

15. The processor according to any one or a combination of any two or more of 1-14 above and 16-22 below, wherein each of the display units includes a position sensor that respectively determines the position of said at least one LEE display module.

16. The processor according to any one or a combination of any two or more of 1-5 above and 7-22 below, wherein the position sensor includes one or a combination of one or more of a microswitch, rocket switch, gyroscope, hall sensor, connector, accelerometer, or photodiode.

17. A display system comprising a plurality of display units, each of the plurality of display units respectively comprising a display tile and a processor according to any one or a combination of any two or more of 1-6 above and 18-22 below.

18. The display system according to any one or a combination of any two or more of 1-17 above and 19-22 below, wherein said display system is a dynamic display system, wherein position information includes information relating to one or more of a rotation, translation, or repositioning of the at least one of said one or more LEE display modules that occurs for different or every frame or image to be displayed, depending on the image that is intended to be displayed, on a video sequence of images, in an automated manner, or based on input from a user or input from an audience or environment.

19. The processor according to any one or a combination of any two or more of 1-18 above and 20-22 below, wherein said display system is movably mounted in said arrangement, and said data to be displayed is automatically mapped to said target location by the processor depending on a movement of said display system.

20. The processor according to any one or a combination of any two or more of 1-19 above and 21-22 below, further comprising digital logic within said processor of said at least one hub board, the digital logic being configured to convert said data to be displayed to logic that can be interfaced with said at least one LEE display module.

21. A hub board comprising the processor according to any one or a combination of any two or more of 1-20 above and 22 below.

22. The processor according to any one or a combination of any two or more of 1-21 above, wherein said one or more display tiles or are configured to be rotated, translated, and/or repositioned.

According to a third group of embodiments:

1. A display system comprising: one or more display units, wherein each of the one or more display units respectively comprises a display tile and a processor, wherein each of the display tiles includes one or more LEE display modules, each of the LEE display modules respectively including an array of a plurality of light-emitting elements (LEEs), wherein each of the processors are configured, for the respective display tile, to receive data to be displayed by said at least one of said one or more LEE display modules, said data having an original location to be displayed to, and perform a mapping of said data to be displayed to a target location of said at least one LEE display module taking into account position information of at least one of said one or more LEE display modules.

2. The display system according to any one or a combination of any two or more of 1 above and 3-18 below, wherein said position information includes radial coordinates or Cartesian coordinates.

3. The display system according to any one or a combination of any two or more of 1-2 above and 4-18 below, wherein said position information includes information relating to one or more of a rotation, translation, or repositioning of the at least one of said one or more LEE display modules.

4. The display system according to any one or a combination of any two or more of 1-3 above and 5-18 below, wherein each of the processors are configured, for the respective display tile, to further output a display data to said tile of the respective display unit, said display data including said data to be displayed modified with said mapping to the target location.

5. The display system according to any one or a combination of any two or more of 1-4 above and 6-18 below, wherein in mapping said data to be displayed to the target location, said one or more LEEs are located each at a target position coordinate within said target location.

6. The display system according to any one or a combination of any two or more of 1-5 above and 7-18 below, wherein said position information includes at least one position coordinate corresponding to a relative position of at least one LEE within said at least one LEE display module, and also corresponding to an absolute position of the at least one LEE respectively within said display.

7. The display system according to any one or a combination of any two or more of 1-6 above and 8-18 below, wherein each of the one or more display units includes a memory having stored therein instructions and/or an algorithm for performing said mapping.

8. The display system according to any one or a combination of any two or more of 1-7 above and 9-18 below, wherein said memory is respectively provided on said one of said one or more LEE display modules.

9. The display system according to any one or a combination of any two or more of 1-8 above and 10-18 below, wherein said display tile and said processor of each of the one or more display units are physically coupled together.

10. The display system according to any one or a combination of any two or more of 1-9 above and 11-18 below, wherein said display tile and said processor of each of the one or mor display units are integrally formed.

11. The display system according to any one or a combination of any two or more of 1-10 above and 12-18 below, wherein each of the one or more display units includes a hub board to which are coupled the said one of said one or more LEE display modules and the processor.

12. The display system according to any one or a combination of any two or more of 1-11 above and 13-18 below, wherein the data to be displayed includes text, images and/or video.

13. The display system according to any one or a combination of any two or more of 1-12 above and 14-18 below, wherein each of said one or more display units are LED display units and each of the LEEs are LEDs.

14. The display system according to any one or a combination of any two or more of 1-13 above and 15-18 below, further comprising a locator for determining a position of said at least one LEE display module of said one or more display tiles.

15. The display system according to any one or a combination of any two or more of 1-14 above and 16-18 below, wherein each of the display units includes a position sensor that respectively determines the position of said at least one LEE display module.

16. The display system according to any one or a combination of any two or more of 1-15 above and 17-18 below, wherein the position sensor includes one or a combination of one or more of a microswitch, rocker switch, gyroscope, hall sensor, connector, accelerometer, or photodiode.

17. The display system according to any one or a combination of any two or more of 1-16 above and below, wherein the display system comprises a plurality of display units, each of the plurality of display units respectively comprising a display tile and a processor.

18. An arrangement comprising the display system according to any one or a combination of any two or more of 1-17 above, wherein said display system is movably mounted in said arrangement, and said data to be displayed is automatically mapped to said target location depending on a movement of said display system.

19. The display system according to any one or a combination of any two or more of 1-17 above and below, wherein the position information of the at least one of said one or more LEE display modules is provided to the processor with the data to be displayed, 20. The display system according to 19 above, wherein the position information is received from the processor from central device that transmits the data to be displayed to the processor.

21. The display system according to 20 above, wherein the central device is a central video processing device.

22. The display system according to 20 above, wherein the position information is transmitted to the processor in the same data stream as the data to be displayed and/or in a different or separate data transmission, signal, or stream.

According to a fourth group of embodiments and/or examples:

1. A display method for a display system including one or more display units, wherein each of the one or more display units respectively comprises a display tile and a processor, wherein each of the display tiles includes one or more LEE display modules, each of the LEE display modules respectively including an array of a plurality of light-emitting elements (LEEs), said method comprising performing the following steps with said respectively processor of said one or more display units: receiving position information of at least one of said one or more LEE display modules; receiving data to be displayed by said at least one of said one or more LEE display modules, said data having an original location to be displayed to; and performing a mapping of said data to be displayed to a target location of said at least one LEE display module taking into account said position information of at least one of said one or more LEE display modules.

2. The display method according to any one or a combination of any two or more of 1 above and 3-22 below, wherein said position information includes radial coordinates or Cartesian coordinates.

3. The display method according to any one or a combination of any two or more of 1-2 above and 4-22 below, wherein said position information includes information relating to one or more of a rotation, translation, or repositioning of the at least one of said one or more LEE display modules.

4. The display method according to any one or a combination of any two or more of 1-3 above and 5-22 below, wherein each of the processors are configured, for the respective display tile, to further output a display data to said tile of the respective display unit, said display data including said data to be displayed modified with said mapping to the target location.

5. The display method according to any one or a combination of any two or more of 1-4 above and 6-22 below, wherein in mapping said data to be displayed to the target location, said one or more LEEs are located each at a target position coordinate within said target location.

6. The display method according to any one or a combination of any two or more of 1-5 above and 7-22 below, wherein said position information includes at least one position coordinate corresponding to a relative position of at least one LEE within said at least one LEE display module, and also corresponding to an absolute position of the at least one LEE respectively within said display.

7. The display method according to any one or a combination of any two or more of 1-6 above and 8-22 below, wherein each of the one or more display units includes a memory having stored therein instructions and/or an algorithm for performing said mapping.

8. The display method according to any one or a combination of any two or more of 1-7 above and 9-22 below, wherein said memory is respectively provided on said one of said one or more LEE display modules.

9. The display method according to any one or a combination of any two or more of 1-8 above and 10-22 below, wherein said display tile and said processor of each of the one or more display units are physically coupled together.

10. The display method according to any one or a combination of any two or more of 1-9 above and 11-22 below, wherein said display tile and said processor of each of the one or mor display units are integrally formed.

11. The display method according to any one or a combination of any two or more of 1-10 above and 12-22 below, wherein each of the one or more display units includes a hub board to which are coupled the said one of said one or more LEE display modules and the processor.

12. The display method according to any one or a combination of any two or more of 1-11 above and 13-22 below, wherein the data to be displayed includes text, images and/or video.

13. The display method according to any one or a combination of any two or more of 1-12 above and 14-22 below, wherein each of said one or more display units are LED display units and each of the LEEs are LEDs.

14. The display method according to any one or a combination of any two or more of 1-13 above and 15-22 below, further comprising a locator for determining a position of said at least one LEE display module of said one or more display tiles.

15. The display method according to any one or a combination of any two or more of 1-14 above and 16-22 below, wherein each of the display units includes a position sensor that respectively determines the position of said at least one LEE display module.

16. The display method according to any one or a combination of any two or more of 1-15 above and 17-22 below, wherein the position sensor includes one or a combination of one or more of a microswitch, rocker switch, gyroscope, hall sensor, connector, accelerometer, or photodiode.

17. The display method according to any one or a combination of any two or more of 1-16 above and 18-22 below, wherein the display system comprises a plurality of display units, each of the plurality of display units respectively comprising a display tile and a processor.

18. A display arrangement configured to perform the method according to any one or a combination of any two or more of 1-17 above and -22 below, wherein said display system is movably mounted in said arrangement, and said data to be displayed is automatically mapped to said target location depending on a movement of said display system.

19. The display method according to any one or a combination of any two or more of 1-18 above above or a combination of any two or more of 20-22 below, wherein said one or more display tiles or are configured to be rotated, translated, and/or repositioned.

20. The display method according to any one or a combination of any two or more of 1-19 above and 21-22 below, wherein the display system further comprises digital logic within said processor of said at least one hub board, the digital logic being configured to convert said data to be displayed to logic that can be interfaced with said at least one LEE display module.

21. The display method according to any one or a combination of any two or more of 1-20 above, wherein said one or more display tiles or are configured to be rotated, translated, and/or repositioned.

22. A hardware storage device having stored thereon computer-executable instructions which, when executed by one or more processors of a display system, configure the one or more processors to perform the method according to any one or a combination of any two or more of 1-21 above.

22. The display method according to any one or a combination of any two or more of 1-21 above, wherein said one or more display tiles or are configured to be rotated, translated, and/or repositioned.

Although various example embodiments have been described in detail herein, those skilled in the art will readily appreciate in view of the present disclosure that many modifications are possible in the example embodiments without materially departing from the concepts of present disclosure. Accordingly, any such modifications are intended to be included in the scope of this disclosure. Likewise, while the disclosure herein contains many specifics, these specifics should not be construed as limiting the scope of the disclosure or of any of the appended claims, but merely as providing information pertinent to one or more specific embodiments that may fall within the scope of the disclosure and the appended claims. Any described features from the various embodiments disclosed may be employed in combination. In addition, other embodiments of the present disclosure may also be devised which lie within the scopes of the disclosure and the appended claims. Each addition, deletion, and modification to the embodiments that falls within the meaning and scope of the claims is to be embraced by the claims.

Certain embodiments and features may have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges may appear in one or more claims below. Any numerical value is "about" or "approximately" the indicated value, and takes into account experimental error and variations that would be expected by a person having ordinary skill in the art.

The invention claimed is:
1. A display system comprising:
one or more display units,
    wherein each of the one or more display units respectively comprises a display tile and a processor,
    wherein each of the display tiles includes one or more LEE display modules, each of the LEE display modules respectively including an array of a plurality of light-emitting elements (LEEs),
wherein each of the processors are configured, for the respective display tile, to receive position information of at least one of said one or more LEE display modules, wherein the position information includes physical coordinates of the at least one of said one or more LEE display modules, receive data to be displayed by said at least one of said one or more LEE display modules, said data having an original location to be displayed to, and perform a mapping of said data to be displayed to a target location of said at least one LEE display module taking into account said position information of at least one of said one or more LEE display modules.

2. The display system according to claim 1, wherein said position information includes radial coordinates or Cartesian coordinates.

3. The display system according to claim 1, wherein said position information includes information relating to one or more of a rotation, translation, or repositioning of the at least one of said one or more LEE display modules.

4. The display system according to claim 1, wherein each of the processors are configured, for the respective display tile, to further output a display data to said tile of the respective display unit, said display data including said data to be displayed modified with said mapping to the target location.

5. The display system according to claim 1, wherein in mapping said data to be displayed to the target location, said one or more LEEs are located each at a target position coordinate within said target location.

6. The display system according to claim 1, wherein said position information includes at least one position coordinate corresponding to a relative position of at least one LEE within said at least one LEE display module, and also corresponding to an absolute position of the at least one LEE respectively within said display.

7. The display system according to claim 1, wherein each of the one or more display units includes a memory having stored therein instructions and/or an algorithm for performing said mapping.

8. The display system according to claim 7, wherein said memory is respectively provided on said one of said one or more LEE display modules.

9. The display system according to claim 1, wherein said display tile and said processor of each of the one or more display units are physically coupled together.

10. The display system according to claim 1, wherein said display tile and said processor of each of the one or mor display units are integrally formed.

11. The display system according to claim 1, wherein each of the one or more display units includes a hub board to which are coupled the said one of said one or more LEE display modules and the processor.

12. The display system according to claim 1, wherein the data to be displayed includes text, images and/or video.

13. The display system according to claim 1, wherein each of said one or more display units are LED display units and each of the LEEs are LEDs.

14. The display system according to claim 1, further comprising a locator for determining a position of said at least one LEE display module of said one or more display tiles.

15. The display system according to claim 1, wherein each of the display units includes a position sensor that respectively determines the position of said at least one LEE display module.

16. The display system according to claim 1, wherein the position sensor includes one or a combination of one or more of a microswitch, rocker switch, gyroscope, hall sensor, connector, accelerometer, or photodiode.

17. The display system according to claim 1, wherein the display system comprises a plurality of display units, each of the plurality of display units respectively comprising a display tile and a processor.

18. The display system according to claim 1, wherein said display system is a dynamic display system, wherein position information includes information relating to one or more of a rotation, translation, or repositioning of the at least one of said one or more LEE display modules that occurs for different or every frame or image to be displayed, depending on the image that is intended to be displayed, on a video sequence of images, in an automated manner, or based on input from a user or input from an audience or environment.

19. An arrangement comprising the display system as in claim 1, wherein said display system is movably mounted in said arrangement, and said data to be displayed is automatically mapped to said target location depending on a movement of said display system.

20. A display system comprising:
one or more display units,
wherein each of the one or more display units respectively comprises a display tile and a processor,
wherein each of the display tiles includes one or more LEE display modules, each of the LEE display modules respectively including an array of a plurality of light-emitting elements (LEEs),
wherein each of the processors are configured, for the respective display tile, to
receive data to be displayed by said at least one of said one or more LEE display modules, said data having an original location to be displayed to, and
perform a mapping of said data to be displayed to a target location of said at least one LEE display module taking into account position information of at least one of said one or more LEE display modules, wherein the position information includes physical coordinates of the at least one of said one or more LEE display modules.

21. A hardware storage device having stored thereon computer-executable instructions which, when executed by one or more processors of a display system, configure the one or more processors to perform the method according to claim 20.

22. A display method for a display system including one or more display units, wherein each of the one or more display units respectively comprises a display tile and a processor, wherein each of the display tiles includes one or more LEE display modules, each of the LEE display modules respectively including an array of a plurality of light-emitting elements (LEEs), said method comprising performing the following steps with said respectively processor of said one or more display units:
receiving position information of at least one of said one or more LEE display modules, wherein the position information includes physical coordinates of the at least one of said one or more LEE display modules;
receiving data to be displayed by said at least one of said one or more LEE display modules, said data having an original location to be displayed to; and
performing a mapping of said data to be displayed to a target location of said at least one LEE display module taking into account said position information of at least one of said one or more LEE display modules.

\* \* \* \* \*